(12) United States Patent
Klein

(10) Patent No.: US 7,027,953 B2
(45) Date of Patent: Apr. 11, 2006

(54) METHOD AND SYSTEM FOR DIAGNOSTICS AND PROGNOSTICS OF A MECHANICAL SYSTEM

(75) Inventor: Renata Klein, Misgav (IL)

(73) Assignee: RSL Electronics Ltd., Migdal Haemek (IL)

(*) Notice: Subject to any disclaimer, the term of this patent is extended or adjusted under 35 U.S.C. 154(b) by 227 days.

(21) Appl. No.: 10/334,477

(22) Filed: Dec. 30, 2002

(65) Prior Publication Data
US 2005/0096873 A1 May 5, 2005

(51) Int. Cl.
*G06F 15/00* (2006.01)

(52) U.S. Cl. .................. 702/184; 702/182; 702/183; 702/185

(58) Field of Classification Search .............. 702/54, 702/56, 77, 81, 122, 150, 182–185; 700/38, 700/279, 280, 287; 290/408; 701/120; 244/1 N; 340/945; 706/52
See application file for complete search history.

(56) References Cited

U.S. PATENT DOCUMENTS

| | | | |
|---|---|---|---|
| 3,758,758 A | | 9/1973 | Games et al. |
| 4,283,634 A | * | 8/1981 | Yannone et al. .......... 290/40 R |
| 4,320,662 A | | 3/1982 | Schaub et al. |
| 4,426,641 A | | 1/1984 | Kurihara et al. |
| 4,488,240 A | | 12/1984 | Kapadia et al. |
| 4,787,053 A | * | 11/1988 | Moore ........................ 701/123 |
| 4,985,857 A | | 1/1991 | Bajpai et al. |
| 4,988,979 A | * | 1/1991 | Sasaki et al. ............... 340/683 |
| 4,989,159 A | | 1/1991 | Liszka et al. |
| 5,150,855 A | * | 9/1992 | Kaptein ...................... 244/1 N |
| 5,210,704 A | | 5/1993 | Husseiny |
| 5,211,539 A | * | 5/1993 | McCarty ...................... 416/61 |
| 5,223,207 A | | 6/1993 | Gross et al. |
| 5,239,468 A | | 8/1993 | Sewersky et al. |

(Continued)

OTHER PUBLICATIONS

Han, Y. et al., "A self–learning expert system for grinding vibration diagnosis," Dept of Prod. Syst. Eng., Toyohashi Univ. of Technol., Japan, *Conf: Artificial Intelligence in the Pacific Rim, Proceedings of the Pacific Rim International Conference on Artificial Intelligence*, p. 146–51, 1991.

Carr, H.R., "Aero–engine vibration diagnosis on a DSP–accelerated personal computer," Dept. of Exp. Vibration, Rolls–Royce plc, Bristol, UK; *Conf: IEE Colloquium on Advanced Vibration Measurements, Techniques and Instrumentation for the Early Prediction of Failure*, Digest No. 105, p. 5/1–16, 1992.

Arefzadeh, S. et al., "Diagnosis of diesel engines based on vibration analysis and fuzzy–logic," Inst. Fur Bergwerks–und Huttenmaschinenkunde, Aachen Univ. of Technol., Germany; *Conf: Fourth European Congress on Intelligent Techniques and Soft Computing Proceedings*, EUFIT '96, Part vol. 2, p. 1497–500, 1996.

Cempel, C., "Theory of energy transforming systems and their application in diagnostics of operating systems," Inst. of Appl. Mech., Tech. Univ. Poznan, Poland, *Applied Mathematics and Computer Science*, vol. 3, No. 3, p. 533–48, 1993.

*Primary Examiner*—Carol S Tsai
(74) *Attorney, Agent, or Firm*—Skadden, Arps, Slate, Meagher & Flom LLP

(57) ABSTRACT

A vibrational analysis system diagnosis the health of a mechanical system by reference to vibration signature data from multiple domains. Features are extracted from signature data by reference to pointer locations. The features provide an indication of signature deviation from a baseline signature in the observed domain. Several features applicable to a desired fault are aggregated to provide an indication of the likelihood that the fault has manifested in the observed mechanical system. The system may also be used for trend analysis of the health of the mechanical system.

47 Claims, 8 Drawing Sheets

U.S. PATENT DOCUMENTS

| | | | |
|---|---|---|---|
| 5,293,585 A | | 3/1994 | Morita |
| 5,351,247 A | | 9/1994 | Dow et al. |
| 5,383,133 A | | 1/1995 | Staple |
| 5,519,637 A | * | 5/1996 | Mathur ................. 700/280 |
| 5,526,292 A | * | 6/1996 | Hodgson et al. ............ 700/280 |
| 5,551,649 A | * | 9/1996 | Kaptein .................... 244/1 N |
| 5,566,092 A | | 10/1996 | Wang et al. |
| 5,574,646 A | | 11/1996 | Kawasaki et al. |
| 5,579,232 A | | 11/1996 | Tong et al. |
| 5,600,576 A | * | 2/1997 | Broadwater et al. ........ 702/187 |
| 5,602,757 A | | 2/1997 | Haseley et al. |
| 5,610,339 A | | 3/1997 | Haseley et al. |
| 5,698,788 A | | 12/1997 | Mol et al. |
| 5,726,891 A | | 3/1998 | Sisson et al. |
| 5,768,124 A | * | 6/1998 | Stothers et al. ............... 700/38 |
| 5,774,376 A | | 6/1998 | Manning |
| 5,804,726 A | | 9/1998 | Geib et al. |
| 5,806,011 A | | 9/1998 | Azzaro et al. |
| 5,809,437 A | | 9/1998 | Breed |
| 5,852,793 A | | 12/1998 | Board et al. |
| 5,854,993 A | | 12/1998 | Grichnik |
| 5,893,892 A | | 4/1999 | Loeffler |
| 5,895,857 A | | 4/1999 | Robinson et al. |
| 5,951,611 A | | 9/1999 | La Pierre |
| 5,978,727 A | | 11/1999 | Jones et al. |
| 6,004,017 A | | 12/1999 | Madhavan |
| 6,014,447 A | | 1/2000 | Kohnen et al. |
| 6,014,598 A | | 1/2000 | Duyar et al. |
| 6,027,239 A | * | 2/2000 | Ghassaei ................. 700/279 |
| 6,175,787 B1 | | 1/2001 | Breed |
| 6,192,325 B1 | | 2/2001 | Piety et al. |
| 6,199,018 B1 | | 3/2001 | Quist et al. |
| 6,260,004 B1 | | 7/2001 | Hays et al. |
| 6,295,510 B1 | | 9/2001 | Descenzo |
| 6,298,308 B1 | | 10/2001 | Reid et al. |
| 6,301,572 B1 | * | 10/2001 | Harrison ..................... 706/52 |
| 6,321,602 B1 | | 11/2001 | Ben-Romdhane |
| 6,343,251 B1 | | 1/2002 | Herron et al. |
| 6,363,303 B1 | | 3/2002 | Bertness |
| 6,711,523 B1 | * | 3/2004 | Bechhoefer et al. ........ 702/181 |
| 2001/0001851 A1 | | 5/2001 | Piety et al. |
| 2002/0013635 A1 | | 1/2002 | Gotou et al. |
| 2002/0032544 A1 | | 3/2002 | Reid et al. |
| 2002/0038199 A1 | * | 3/2002 | Blemel ..................... 702/183 |
| 2003/0083794 A1 | * | 5/2003 | Halm et al. ................. 701/29 |
| 2004/0003318 A1 | * | 1/2004 | Felke et al. ................. 714/25 |

* cited by examiner

METHOD AND SYSTEM FOR DIAGNOSTICS AND PROGNOSTICS OF A MECHANICAL SYSTEM

FIELD OF THE INVENTION

The present invention relates generally to a system for monitoring the condition of a mechanical system such as an aircraft engine. More specifically the invention relates to a diagnostic and prognostic method and system applicable to rotating machinery and in particular, aircraft engines and helicopter gearboxes.

BACKGROUND OF THE INVENTION

The use of vibration analysis as part of maintaining rotational mechanical systems is well known. Diagnostics of mechanical systems using vibration signatures have been researched in academic frameworks in connection with gear diagnostics, helicopter diagnostics, robots, ship vibrations, tool-ware monitoring, and transportation. Another application is power plant monitoring systems, especially those used in nuclear plants, which frequently use vibration signatures to identify worn parts requiring maintenance and other faults.

In an aircraft engine, each machine (combination of parts applying energy to do work), such as fan, compressor, turbine, and gear box, has a unique and repeatable vibration signature. Because the levels, profile, and features of these vibration signatures correlate well between runs of the same engine, as well as between different engines of the same type, vibration signatures can be a useful diagnostic tool. The high correlation between the levels, profile, and features of each run, for each machine mentioned above, can be seen in FIG. 1, which illustrates vibration signatures from two runs for an exemplary engine, and in FIG. 2, which illustrates the similarity in levels, profile, and features of vibration signatures of different engines of the same type. FIG. 1 illustrates frequency domain analysis data from two runs on the same machine. As one of ordinary skill in the art will appreciate, the data collected during the runs is substantially identical. The levels and locations of peaks are almost the same between the two runs. FIG. 2 illustrates frequency domain analysis data from two runs on two engines of the same type. As may be appreciated, the collected data is closely correlated between the two runs.

Generally, monitoring a mechanical system by analyzing vibration signatures begins with collecting vibration data at various points in the system using vibration sensors. The data is analyzed manually, electronically, or by a combination of the two, to determine whether the data reflects normal or abnormal conditions of the mechanical system. The vibrations represent the structural, dynamic, and aerodynamic characteristics of the observed components. In this manner, abnormalities, such as cracks, deformities, defective parts, and deteriorated engine modules may be diagnosed and the necessary maintenance may be performed.

In addition to using vibration signatures for diagnostics, recent attention has been given to the use of vibration data for trend analysis, or prognostics, in mechanical systems. Trend analysis is generally concerned with identifying an abnormality at its incipient stage. Trend analysis is a valuable tool, which enables one to proceed with corrective steps before an abnormality grows to a more costly, or even catastrophic, condition.

Diagnostic and prognostic approaches to mechanical systems using vibration signatures have continually progressed. For example, recent approaches include expanded automation, so as to significantly reduce dependence on a human operator. Moreover, while earlier approaches required shutting down operations in order to install a diagnostic apparatus, take measurements, and perform the necessary analysis, more recent systems have been designed to allow for online data collection. Finally, the tools for analyzing the data to reach a diagnosis or prognosis have become more sophisticated, and therefore more sensitive to abnormalities and trend data.

However, current systems do not allow for concurrent data collection and data processing. Furthermore, the utilized vibration analysis is usually limited to narrow bandwidth spectrum and to a single domain, such as the frequency domain. In other words, the vibration signal is represented as a function over a set of frequencies. Typically the Fast Fourier Transform ("FFT"), is used to provide the representation of the vibrational signature in the frequency domain. However, the FFT, because it is based on a single frame of data with a statistical error measured as 1/(Number of frames), is statistically unreliable. Even recent applications that have turned to the power spectral density ("PSD") for vibration analysis, because it provides higher reliability than the FFT, are generally limited to a single domain. Such FFTs are discussed in A. Mertins, Signal Analysis—Wavelets, Filter Banks, Time-Frequency Transforms and Applications (John Wiley & Sons, 1999), hereby incorporated by reference as if fully set forth herein.

Some applications calculate the PSD using Auto Regressive Moving Average ("ARMA") modeling. ARMA modeling is used to detect structural frequencies of the machinery as a rigid body and structural frequencies of its constituent parts. The vibrations spectrum/spectrogram is estimated using ARMA model parameters. It is known that the spectrum obtained with ARMA modeling emphasizes the structural frequencies better than the FFT based spectra. A spectrum estimated using ARMA modeling is equivalent, with respect to the signal to noise ratio ("SNR") of the result, to an average of 1000 frames in the traditional FFT-based PSD. ARMA modeling is also described in A. Mertins, Signal Analysis—Wavelets, Filter Banks, Time-Frequency Transforms and Applications.

SUMMARY OF THE INVENTION

A robust and efficient diagnosing and trending method and system is provided for use in the maintenance of a mechanical system, such as an aircraft, or power plant. The invention is based on a multi-domain, wide-band analysis of the vibration patterns of various components of the mechanical system, which reflects the health of the corresponding components. The term Vib-RAY is used herein to refer to the multi-domain, wide-band vibration analysis of the present invention.

In accordance with the method of the present invention, sensors collect vibrational data. The vibration signatures of the monitored components are derived simultaneously in several domains: time, frequency, quefrency, time-frequency, order, amplitude, parameters, RPS-frequency (Rotations Per Second), and cycles. Because vibration signals in different domains, emphasize different faults, by correlating multiple signatures from various domains, the reliability of the diagnosis increases and the number of false alarms decreases.

Every fault type of a monitored component is associated with at least one pointer, defining a frequency region of a vibrational signature in a particular domain. At each pointer, the current vibrational pattern of the component, within the observed frequency region, are compared with a baseline pattern, using preferably up to nine mathematical operators referred to as "diagnostic indices." The set of values provided by each index when the pointer value is entered into the index is referred to herein as a vibration feature. The index is a function that provides a result by reference to a deviation from an expected "normal."

The features from the vibration analysis may be combined with features from gas path data of the mechanical system being monitored. Gas path parameters are physical parameters that characterize operational conditions of the mechanical system. Examples of gas path data include fuel flow, pressure or temperature at various locations and engine stages, oil pressure, and shaft rotating speeds. The extracted features are then aggregated, quantized, and classified using a variety of artificial intelligence techniques, including neural networks, support vectors machine, fuzzy adaptive resonance theory ("fuzzy-ART"), K-nearest neighbor, and expert systems, such as fuzzy logic and Bayesian networks. Thereafter, a hybrid artificial intelligence technique is used to diagnose and/or provide a prognosis for the monitored mechanical system. This decision process includes comparing the aggregated and quantized features to baseline features for particular pointers so as to determine whether the component is operating under normal or abnormal conditions.

Because the system Vib-RAY is sensitive to signature changes and is focused on specific failure modes, it can distinguish between normal and abnormal states and can therefore diagnose abnormal patterns, as well as predict failures, by detecting problems at their incipient stages. The wide-band multi-domain analysis is effective in detecting cracks in blades, degraded bearings, engine compressor stall, damaged gearboxes, and improper assembly. With appropriate pointer identification and detection process, many other abnormalities can be detected, such as degraded gears and clogged nozzles.

Furthermore, in accordance with the present invention, the vibration data may be measured in a non-invasive manner whereby data is collected by a sensor attached to the outer case of the engine, or turbine, or gearbox. Consequently, measurements may be taken during normal operation of the engine, helicopter, or other rotary mechanical system being monitored. The data can thus be advantageously sampled and analyzed online. Because the diagnosis and trending operations may be performed in either real time or offline, Vib-RAY has general applicability for automatic diagnostics of mechanical systems and especially rotating machinery. Applications include engines, power-plants (e.g. aircraft, helicopters, marine, trains, ground vehicles, electrical power generation), drive-trains, gears and transmission, rotors, propellers, generators, and pumps.

The present invention is particularly suitable to be implemented on-board an aircraft and in real time. Unlike prior art technology which require active off-line data mining, the present invention enables on-board, or real time, health diagnostics for rotating machinery.

DETAILED DESCRIPTION

Figure 1:
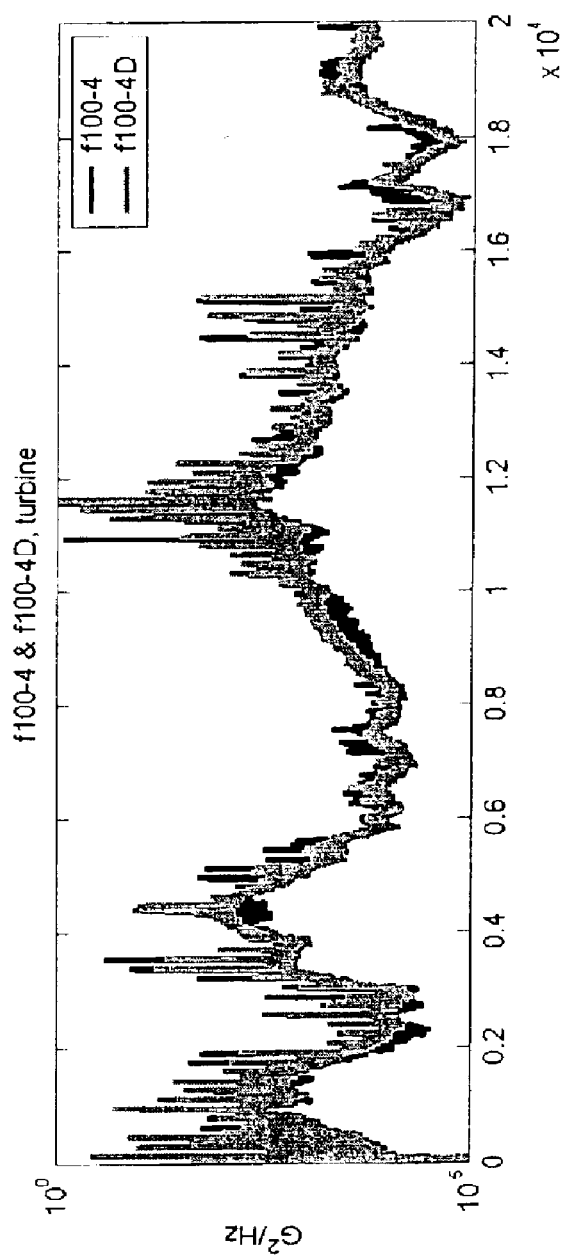
FIG. 1 illustrates a comparison of vibration signature data from different runs on the same engine.
Figure 2:
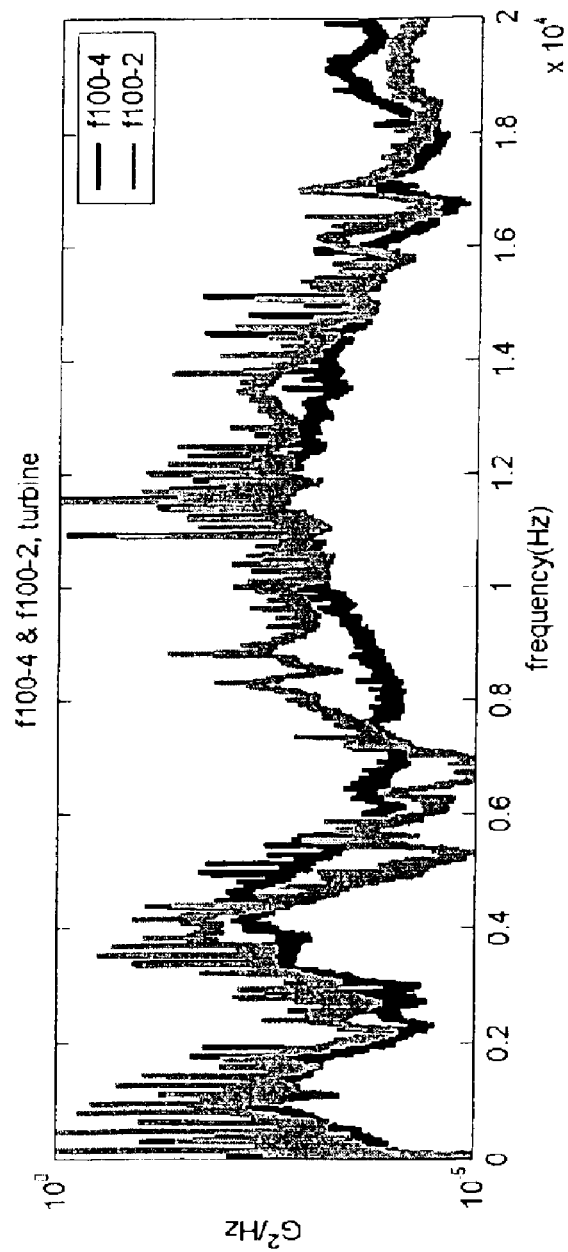
FIG. 2 illustrates vibration signature data from different engines of the same type.

Although the following description refers to aircraft and engines, as may be appreciated, the subject invention is applicable to other type of machines, including helicopters, marine vehicles, land vehicles, electrical power generation stations, trains, engines, gear boxes, drive trains, rotors, generators, and pumps.

Analysis Domain Overview

The prior art vibrational signal analysis for monitoring the health of mechanical systems have largely been confined to analysis in the frequency domain. For example, both the FFT and the PSD spectrograms described above are in the frequency domain. This means the spectrograms depict a power or other value at different measured frequencies of the machine. However, other domains may be useful for health maintenance. These domains include time, order, quefrency, time-frequency response ("TFR"), amplitude, parameters, rotations-per-second ("RPS") frequency, RPS-order, and cycles. Indeed, each of these domains has particular utility for various aspects of system diagnostics or prognostics since each emphasizes a different source of vibration. Current applications generally do not analyze vibrations using more than a single domain. Consequently, other information from the vibration data that may shed light on the health of the mechanical system is lost.

For example, the order domain is useful for analyzing the integrity of rotating parts because it eliminates the dependency of the vibrational spectrum or pattern on the varying rotating speed by concentrating the energy at a specific point. The order domain is derived by calculating the spectrum of the synchronized vibration time series with the rotation speed. After synchronization, the time domain is mapped to the cycle domain.

For diagnostics, however, both synchronous and asynchronous data is necessary. The sampling rate is synchronized with the rotating speed of the monitored machine in order to convert from the frequency domain to the order domain. However, the detection of structural changes (e.g. cracks, blades tip degradation) requires asynchronous data because structural changes are manifested in the frequency domain usually by a shift in the natural frequency, which is provided by a PSD of the asynchronous data. Because existing applications are usually limited to either synchronous or asynchronous data, both the order and the frequency domains are not generally used by existing diagnostic systems.

Another domain useful for vibration analysis is the quefrency domain. The quefrency domain is also known as the Cepstrum domain and is the Inverse Fourier Transform ("IFT") of the logarithm of the power spectrum, See Encyclopedia of Vibration 2001 Vol. 1, page 216, hereby incorporated by reference as if fully set forth herein. Cepstrum enables the automatic detection of side-bands in the frequency or order domain, which appear due to modulation. Because the effects of modulation are known to represent defects in gears and bearings, Cepstrum is widely used to detect such defects.

The use of the Time-Frequency Representation ("TFR") is advantageous for the analysis and the representation of non-stationary signals (i.e., signals reflecting vibrations measured when the rotational speed varies). When the rotating speed varies, the resultant change in operation conditions changes the vibration pattern. The TFR describes the behavior of the spectrum as a function of time, which can be expressed as a function of the rotation speed to eliminate the rotation speed variability. The classic FFT-based spectrogram is an example of a widely used TFR and is calculated by first dividing the period into sequential short segments and then calculating a spectrum for each segment. The resulting spectrogram's drawbacks include the assumption of partial stationarity in each time segment and a compromise between the time and frequency resolution. When the spectrogram is calculated over short time segments the time resolution is improved, while the frequency resolution is degraded. Hence, the frequency resolution is inversely proportional to the time segment. The corollary is also true, when a large segment of time is used, the time resolution is degraded and the frequency resolution is improved. Improvements include the techniques of overlapping and zero padding, which overcome the classic FFT spectrogram resolution problem. The overlapping technique consists, in part, of overlapping the time segments, which may be longer than the non-overlapping segments so as to provide improved frequency resolution while maintaining a better resolution in the time domain, since the time resolution is equal to the resolution provided by the time segments prior to overlap. When each group of sampled points belonging to a segment (frame of time for spectrum calculation) are zero padded, the resulting frequency resolution is improved (depending on the number of zeros padded and the original time series length) without affecting the time resolution.

Another example of a TFR is Wavelet transformation, which is primarily useful for acoustical analysis, as is known in the art. A Wigner—Ville Transformation is a third example of a TFR. This representation has the best joint resolution in time and frequency domains. However, the calculation results in a large matrix, requiring extensive processing. A fourth example of a TFR is the ARMA Spectrogram—Time Dependent model, which is adequate for random wide band signals of short duration. However, because most of the vibration signals measured on rotating machinery have harmonic (narrow band) components, the ARMA spectrogram is not well suited for such application.

The above-mentioned TFR techniques can be used to represent the signal in the RPS-frequency domain or, after re-sampling, the RPS-order domain and statistical moments (in the time or RPS domains) including Root-Mean-Square (RMS), skewness, and kurtosis, which are respectively the $2^{nd}$, $3^{rd}$ and $4^{th}$ statistical moments of the probability density function of the signal. For vibrations signals the RMS represents the average energy of the signal. More specifically, the RMS generally represents the variance or the probability density function width. The skewness measures the symmetry of the probability density function. The kurtosis represents the number and intensity of spikes in a signal. Each one of the above statistical moments can be calculated either in a specific frequency range or over the entire range. Overall figures can be calculated over all the measurement periods or over specific time slices, corresponding to specific rotation speeds.

Each of these domains provides a different benefit for use in vibration analysis. Different engine components have different base frequencies and effective correlation is performed at the third and higher harmonics. Therefore, wide band analysis is important for proper detection of abnormalities. For example, the base frequencies of blade pass, bearings, and gear mesh, are 20 KHz, 4 KHz and 10 KHz, respectively. To detect changes in these components, and to discriminate between pointers, it is important to analyze the vibrations over a large bandwidth. The typical bandwidth used for vibration analysis is from 0 KHz up to about 2–5 KHz.

Process Overview

The automatic trend diagnostic process is described below in detail, but as an overview, it is combined from three main stages. The first stage is data processing. This stage includes data evaluation, outlier's elimination (eliminating clearly invalid data) and trend smoothing. Although the principles of data processing are the same for all data types, there are significant modifications adjusting the processing methods and parameters. For example, data that is collected by flight coupon (manual recordings of critical parameters) has many outliers that should be eliminated or augmented.

The second stage is the Feature extraction, i.e. numerical representation of the monitored parameters characteristics. The features can be parameter deviations from the initialization point (snapshot), or shift of each parameter over a number of cycles. The basic features in current use are: snapshot, short-term shifts, long-term shifts, and varying-term shifts. It should be noted that different features provide different information about the engine. For example: snapshot and short-term shifts provide information on abrupt changes, as broken valves and open bleeds. Long-term shift are more appropriate for detection of slow deterioration of engines.

The third stage is classification. Each of the features is classified by several diagnostic methods. The results of the various diagnostic methods are aggregated so as to increase detection confidence. As may be appreciated, there is substantial interaction between components associated with each of the three stages, such as, for example, by requesting collection of additional data or requesting processing of data in domains and pointer relevant to a detected condition. Furthermore, some of the stages are combined as a single stage in various embodiments of the invention.

System Architecture

Figure 3:
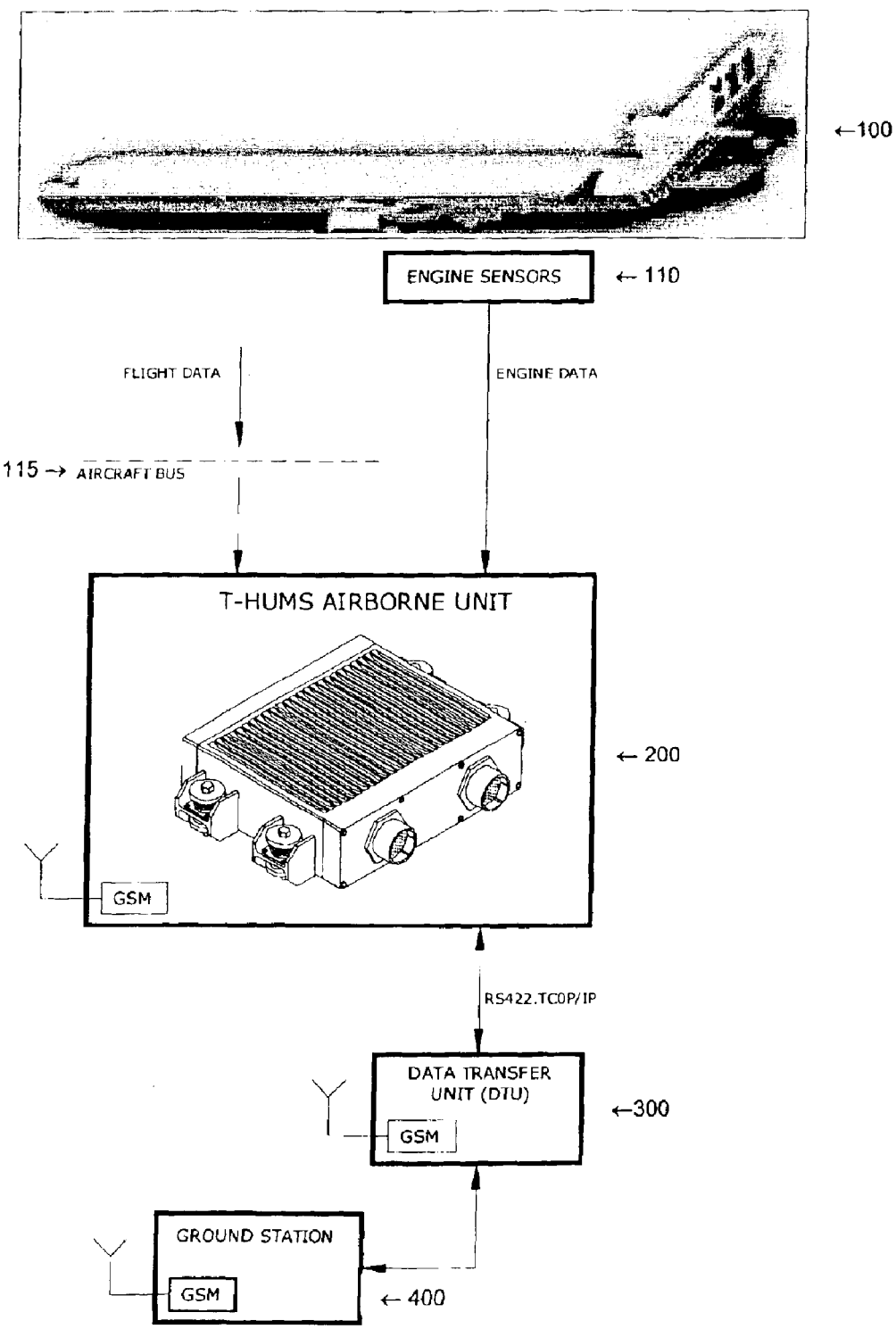
FIG. 3 illustrates a systems level architecture of an embodiment of the invention.
Figure 4:
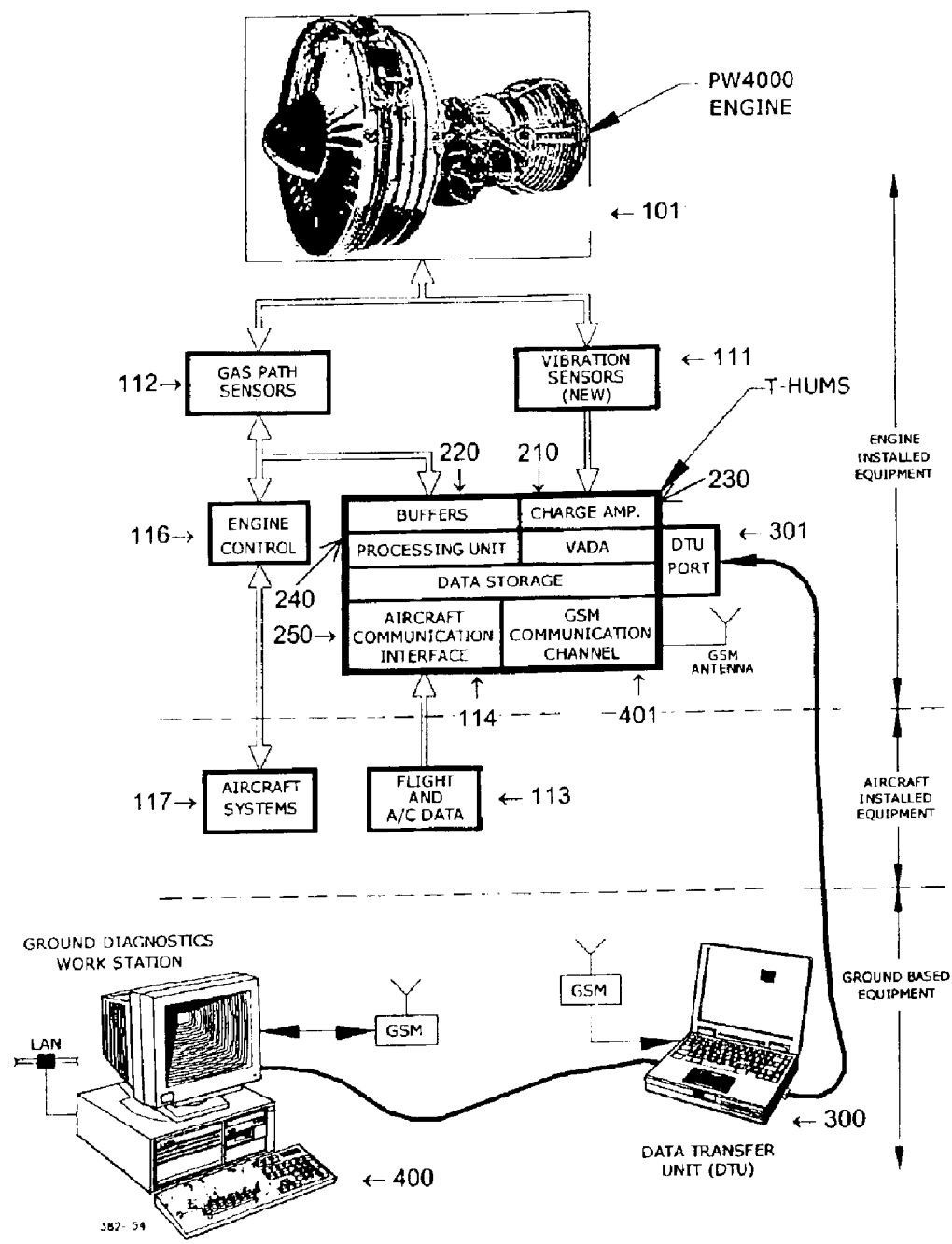
FIG. 4 illustrates further modules associated with the system shown in FIG. 3.

Referring to FIG. 3, an overall system architecture of an embodiment of the present invention is shown. FIG. 4 illustrates a lower level view of the same architecture. The subject mechanical system of this illustration is the engine 101 of aircraft 100. Sensors 110 are used to acquire engine and aircraft data. Vibration sensors 111 measure vibration data and path sensors 112 measure gas path parameters, from various selected components of the engine 101. Gas path parameters are physical parameters that characterize operational conditions of the engine. For example, fuel flow, pressure/temperature at various engine stages, oil pressure, and shaft rotating speeds are gas path parameters.

Gas path data types can be divided into two major categories: repeatable and non-repeatable/transient data. Repeatable data is recorded during predetermined flight regimes. This data can be measured during the following flight phases: run-up, takeoff, cruise, top of climb, and end of descent. Non-repeatable/transient data collection is triggered by events such as over limits alerts, as discussed below. This type of data allows the system to analyze the engine operation during the event and generate new features for automatic diagnostics. The present discussion will only address repeatable data.

The vibration data and gas path parameter data are transferred over a communications bus 115, to the health and maintenance on board unit 200 for further processing. The on board unit 200 includes an aircraft communications interface through which it is coupled to the bus 115. Employing the communication bus 115, the on board unit 200 receives additional information from the engine 101, such as pressure, altitude, ambient temperature and engine control status, which is not measured by the sensors 110.

There are three major resources for data collection. The first resource is flight coupons, which include manual recordings of critical parameters. These parameters are preferably collected only during cruise. These are forms manually filled by the pilot during flight, which include data related to gas path parameters, including speed, altitude, ambient temperature, EGT, pressures, and fuel flow). Flight coupons are generally used in aircraft that do not have ACARS. The reliability of this data is generally lower than other data due to the manual nature of data entry. A second resource is ACARS telegrams, which include automatically collected data. Simple algorithms are used to determine when the aircraft is in a certain predefined flight regime. When a certain flight regime is attained, data is recorded and evaluated for quality. Such data is preferably collected only in a limited number of flight regimes. A third resource is sensor vibration data, which is collected automatically. This resource allows for recording non-repeatable data, when triggered by predefined events (e.g., over limits, Full Authority Digital Engine Control—FADEC alerts). A corresponding flight regime detection algorithm allows for detecting additional flight regimes, e.g., top of climb or end of descent.

The engine control 116 is a general nomenclature for any electronics box, originally installed on the engine by the OEM (e.g., Electronic Engine Control—EEC, FADEC), which is generally used to control the engine operation and its accessories and provide for high level remote operation of the engine by the aircraft systems (such as the flight control computer, the automatic thrust management, and the maintenance computer). Additional parameters required by the engine control 116 for proper operation, are provided by the Air Data Computer (ADC), which supplies environmental conditions data, used by the Engine Control for compensation and adjustments. The engine control 116 also provides measured and processed engine parameters data to the aircraft systems (e.g., Display Electronic Unit—DEU, Central Fault Display Interface Unit—CFDIU, and Digital Flight Data Recorder—DFDR).

The on board unit 200 also receives flight data from the aircraft, such as flight type, speed, and environmental conditions of the flight, as shown by block 113. The charge amplifier 210 is the first stage of the vibration sensors 111 interface. The charge amplifier 210 is used to filter and amplify the electric charge generated by the vibration sensors 111. The charge amplifier 210 converts the electric charge signal into a voltage signal for further sampling and processing by the vibration and data analysis ("VADA") module 230.

Although the on board unit 200 is a non-essential system for proper operation of the aircraft, it is nonetheless environmentally protected as though it was an essential system because it interfaces with critical systems such as the engine control 116. The buffers module 220 is designed to provide sufficient protection to the on board unit 200 against loading on critical signals, induced lightning effect, electromagnetic interference ("EMI"), and High Intensity Radiated Fields (HIRF). The buffers module 220 also isolates the gas path sensors 112 from the on board unit 200.

Gas path and flight data are processed by the processing unit 240. The VADA module 230 samples and analyzes the vibration sensor signals. The primary purposes of the on board unit 200 is to (i) monitor the behavior, integrity and performance of the engine drive train and other engine machineries; (ii) detect and document engine anomalies; and (iii) draw conclusion on their status. In a preferred embodiment of the present invention, the engine and aircraft conditions are monitored from Power ON to Power OFF. As described more fully below, diagnostic algorithms embedded in the on board unit 200 detect engine anomalies or other abnormal situations. When the monitored data exceeds pre-defined limits, such as when the engine temperature exceeds a threshold level or other deviations in flight data, as compared with prior flights, the onboard unit 200 records certain identification information and the history of the monitored parameters onto data storage 250. The identification information preferably includes an advisory fault code, the date and time of the event, and the aircraft and the engine serial number. Various parameters are also recorded when there is a deviation that exceeds a limit. The objective being to provide as much information as possible about the conditions and possible causes of the deviation. In general, all applicable monitored parameters are recorded for a predetermined time frame. All applicable monitored parameters are configurable to the specific engine and aircraft types as well as to the particular installation. In one embodiment, the monitored parameters' history information includes all parameters, other than vibration data, that were monitored during the time period beginning with 10 seconds before the abnormal event was detected and ending with the disappearance of the abnormal event, up to a maximum of 3 minutes. Additionally, twenty seconds of vibration data is recorded during a predetermined timeframe. For example, the time can be set to 10 seconds prior and 10 seconds after the event.

The on board unit 200 also records data at certain predefined normal aircraft operational states or flight regimes. These states preferably include takeoff, climb, cruise, and landing. During these states, the on board unit 200 records identification information and the history of the monitored parameters. The identification information preferably includes a trend identification code, the date and time of the event, the aircraft identification and the engine serial number. The monitored parameters' history information includes all parameters, including vibration data, from 10 seconds prior to the event until 10 seconds after the event. Finally, all monitored parameters are recorded during engine start and engine shut down.

The output of the on board unit 200, as described below, may be communicated to an off-board, or ground, station 400 for further processing. Such communication may be in real time or at a pre-defined schedule using, for example, GSM wireless communication. Alternatively, the on board module output may be stored in a data storage unit 300 from which the data can be transferred to the ground station 400 at a later time.

Based on pre-defined algorithms, the on board unit 200 computes and records Life Usage Indicators ("LUI"). The LUI are recorded as part of the abnormal event parameters, which provide the cumulative engine operating data associated with the event. During normal operating conditions, the LUI are stored by the T-HUMS computer, in its local memory, as opposed to the Mass Storage memory where the abnormal events are recorded. LUI are accumulated parameters retrieved on Power ON, updated during the Power ON cycle, and are recorded upon Engine OFF or Power OFF. LUI includes: low cycle fatigue (LCF), high cycle fatigue (HCF), engine operating time (EOT), number of starts (NOS), engine flight time (EFT), time above dwell temperature, accumulated reverse thrust time, Max Exhaust Gas Temperature (EGT) at start, max fuel request at start, max N2 (free compressor-turbine shaft rotational speed, indicated in Revolutions Per Minutes) at start, oil quantity reduction at start, start stage time, and Shut Down time.

In addition to accumulated data, the data storage 250 also contains the knowledge base of normal and abnormal features against which current and trend features are compared to determine an appropriate diagnosis and prognosis of the mechanical system, as described in more detail below. As will be readily apparent to one skilled in the art, the system architecture as described is flexible and configurable to support various engine types and aircraft platforms.

Data Collection

Figure 5:
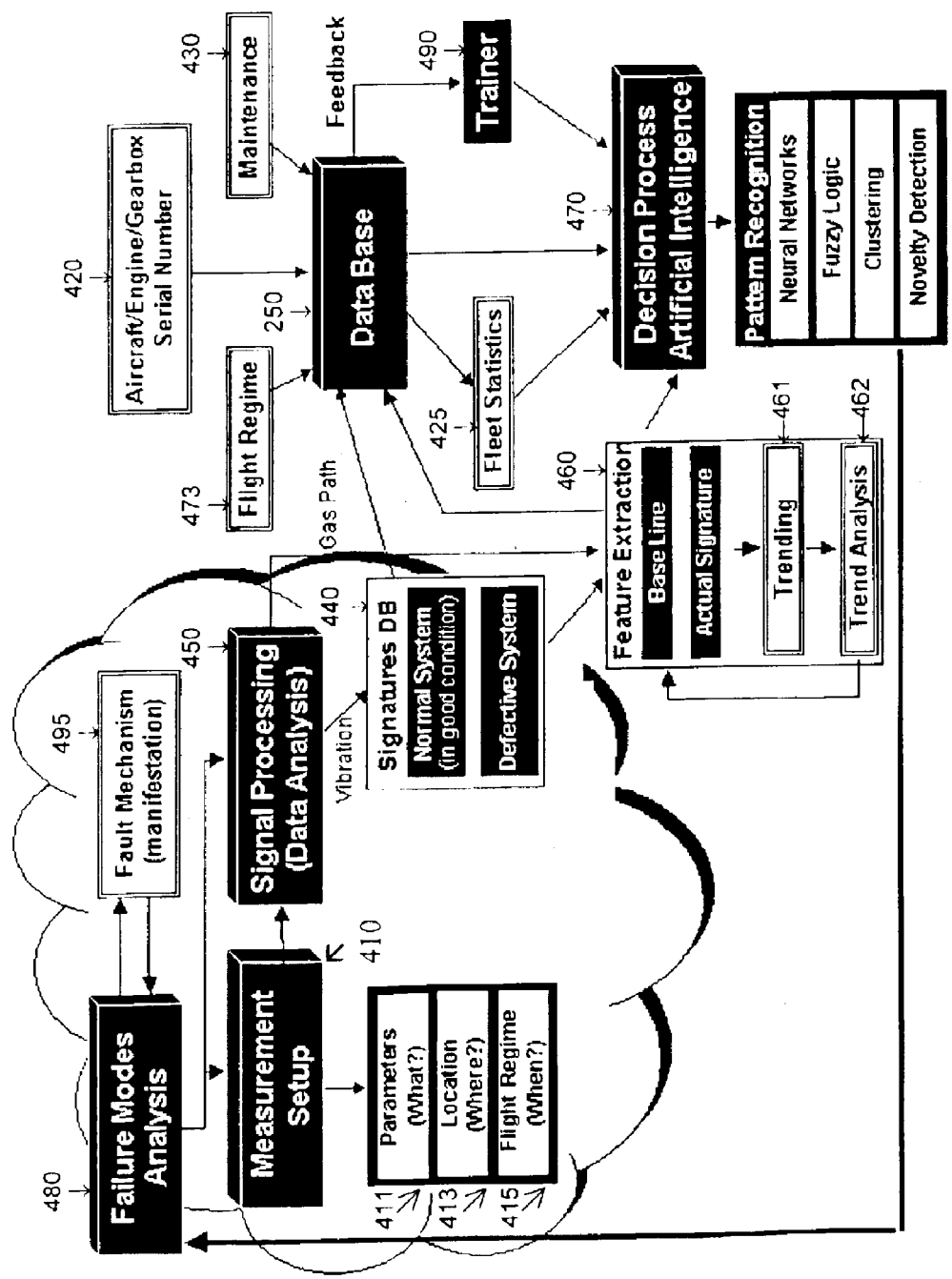
FIG. 5 illustrates a diagnostic process in accordance with the present invention.

Referring to the block diagram of FIG. 5, the diagnostics steps of the present invention are illustrated. Blocks 410 through 413 represent the initialization of the diagnostic method of the present invention, or measurement setup (410). The initialization includes connecting vibration and gas path sensors at appropriate locations (413) and identifying the parameters to be captured (411). Additionally, flight regime data (415), such as, speed, length, and environmental conditions are input into the on-board database 250, illustrated by the arrow leading from block 473 to block 250.

The database 250 also tracks (i) identifying indicia for the monitored aircraft, engine, and gear box (block 420), (ii) the maintenance history of the aircraft (block 430), and (iii) the knowledge-base of normal and defective vibration signatures in the various domains of interest (block 440).

Vibration data is sampled from each vibration sensor at an approximate rate of 50 KHz to 100 KHz, at a preferred bandwidth of 20 KHz to 50 KHz. Employing a segment length of 20 seconds and four sensors, each segment results in four million to eight million words, or samples of vibration data.

As vibration data is collected, vibration signatures are created in a number of domains (block 450). Features are extracted in block 460 and are compared with the features of known signatures by artificial intelligence techniques, as described below (block 470).

When a novel pattern of features is detected, a new diagnostic cycle is triggered, beginning with the Failure Mode Analysis (block 480). The Failure Mode Analysis is a preliminary phase that includes exploration of the specific failure, understanding its mechanism, determining system signature impact, and identifying the affected parameters, including root causes. The result of the failure mode analysis determines the Measurement Setup to follow (decision upon measured parameters, measurement location, bandwidth etc.) (block 410) and the appropriate signatures of Signal Processing (450 block). Specifically, the signature types are advantageously selected depending on the known failure modes and their mechanism so as to focus the observation on the domains and pointers relevant to the expected phenomena, or failure mechanism. Subsequently, new features are extracted and the decision process is adapted. Database 250 is updated with the new feature data and the decision process intelligence is retrained, as shown by block 490. For Expert Systems, the retraining is preferably achieved by expanding the rule base.

Signature Generation

The steps for generating signature data in one embodiment of the invention will now be discussed by reference to FIGS. 6, 7 and 8. Appendix A illustrates the specific algorithms associated with each function for providing a signature, as described below.

Figure 6:
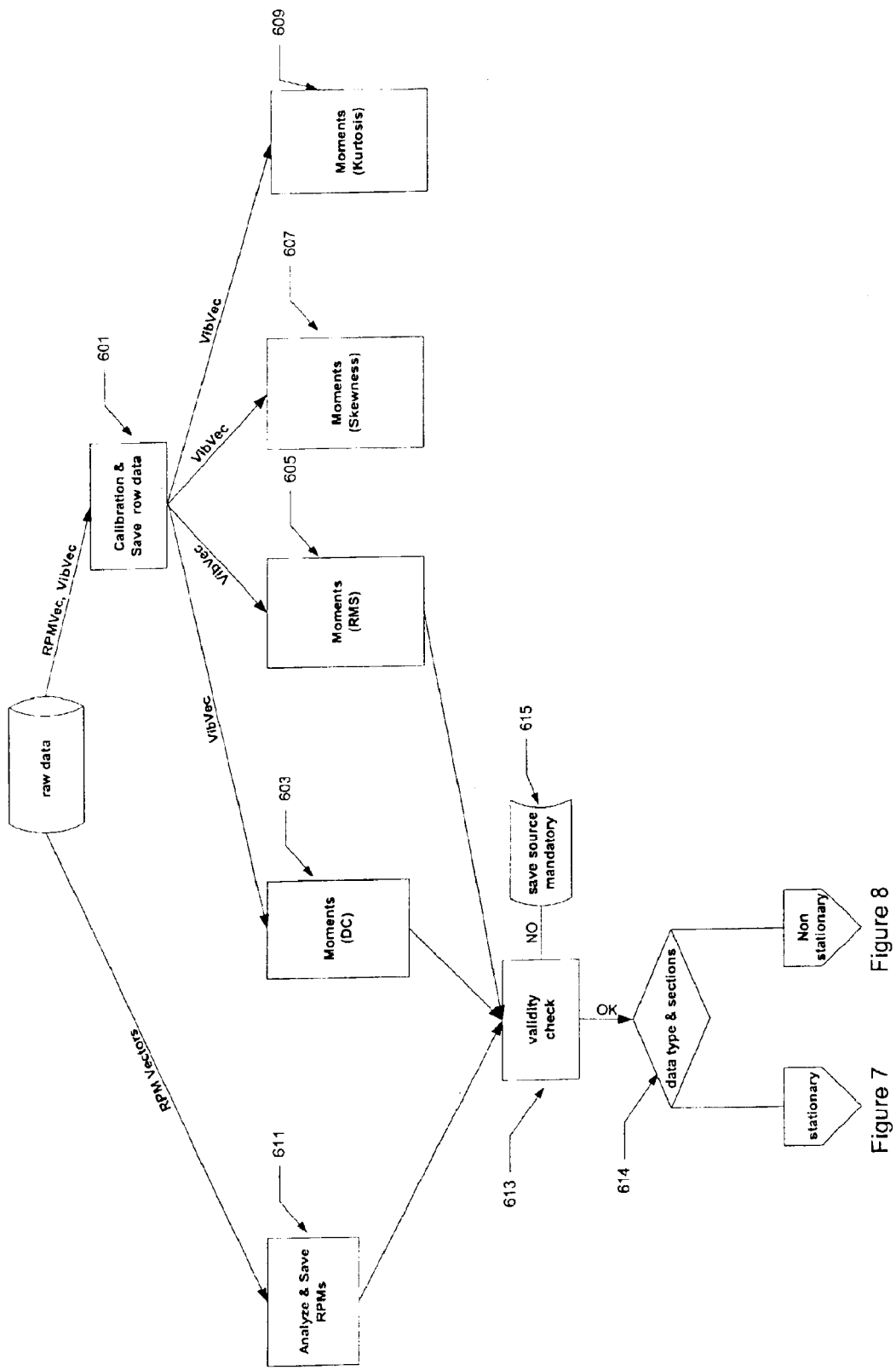
FIG. 6 is a flowchart illustrating a portion of a vibration signal processing algorithm of the invention.

FIG. 6 illustrates the common processing stage for signature generation for all parts. Not shown in FIG. 6, but prior to signature generation, the vibration data is preprocessed to determine quality and validity. This is determined by reference to statistical considerations. For example, the system validates the data collected from the sensors to ensure that the data range is reasonable or realistic by reference to this statistical data.

In addition, preprocessing generates representative values for each parameter. The input parameters (features) used for automatic diagnostics are selected to emphasize characteristics that are correlated to specific failure modes. Data processed from different engine operating regimes enables us to emphasize deterioration phenomena that are more explicit in certain flight regimes. When more than one flight regime reflects a specific failure mechanism, data redundancy is used to increase the diagnostics reliability.

The raw data is preferably calibrated from 16 bit integers to voltage and onto physical units, depending on the gain for each specific channel, which is usually in G units for vibrations (601). Rotating speed analysis is performed, entailing frequency determination using periods between zero crossings, and smoothing using a moving average (611). Zero crossing and smoothing are described in Sections 1.1 and 1.2 of Appendix A, respectively. Statistical moments as a function of time (DC, RMS, Skewness, Kurtosis) are calculated, with a preferred resolution of 0.1 sec (603, 605, 607, 609).

Next, the data is classified as stationary or non-stationary using the analyzed rotating speeds and the statistical moments of the vibrations (614). Data is preferably classified as steady state, stationary data, when it is valid data with changes in the RPM and vibrations RMS in a range of ±10% of the mean value. Data preferably is classified as fast acceleration, non-stationary data, when it is valid data with monotonic increasing RPM of more than 30% in less than 5 sec. Data is preferably classified as slow acceleration, non-stationary data, when it is valid data with monotonic increasing RPM of more than 30% in more than 5 sec. Data is preferably classified as fast deceleration, non-stationary data, when it is valid data with monotonic decreasing RPM of more than 30% in less than 5 sec. Data is preferably classified as slow deceleration, non-stationary data, when it is valid data with monotonic decreasing RPM of more than 30% in more than 5 sec.

Figure 7:
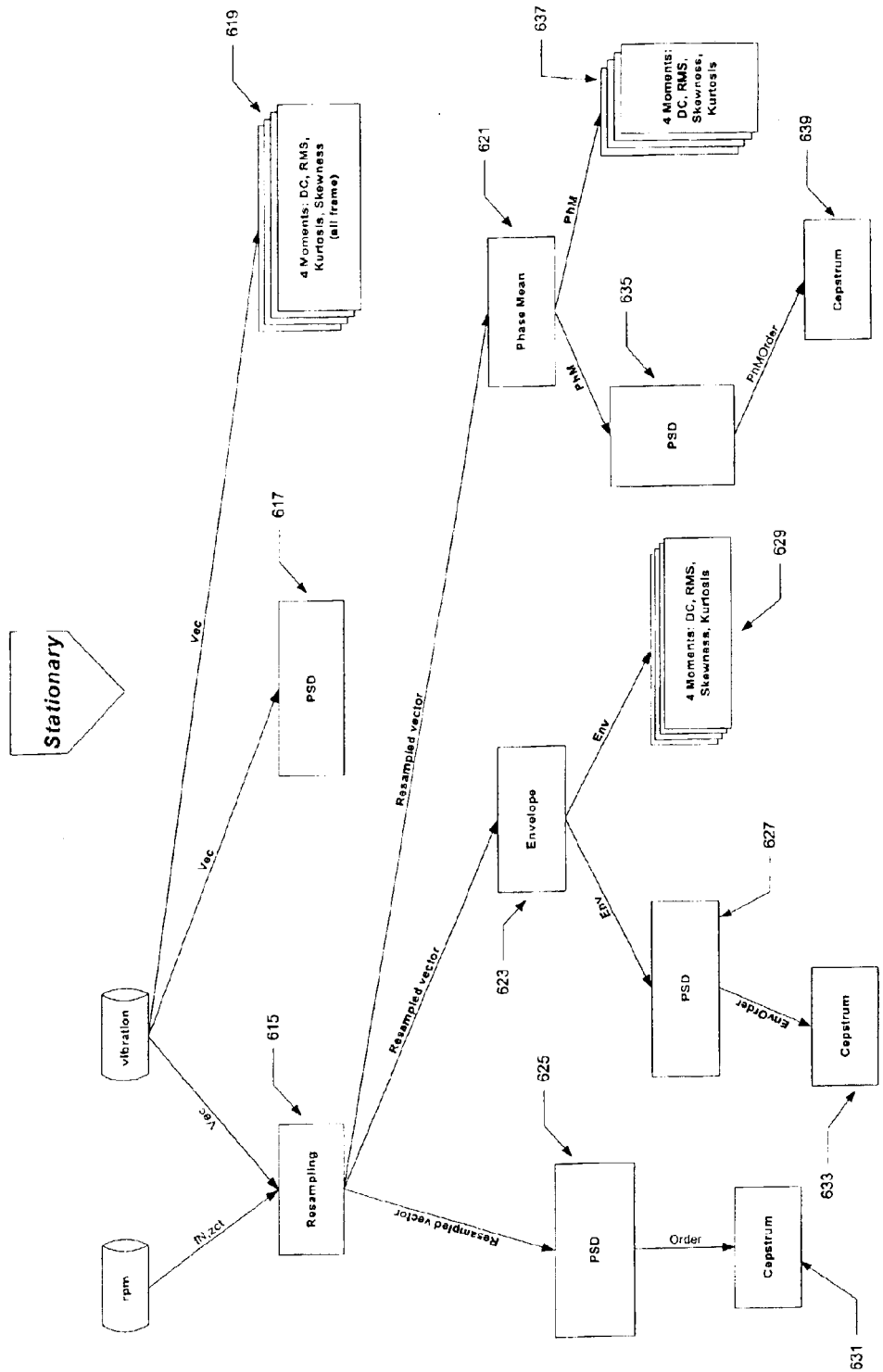
FIG. 7 is a flowchart illustrating a portion of the vibration signal processing algorithm of FIG. 6, which is applicable to stationary parts.

FIG. 7 illustrates signature generation for stationary parts. The system of the present invention calculates signatures in the PSD (617), which uses at least 50 frames for each PSD, resulting in 86% reliability (Such PSD calculation is described in Mertins. A., "Signal Analysis wavelets, Filter Banks, Time-Frequency Transforms and Applications", John Wiley & Sons, 1999, Chapter 5). The PSD is used mainly for detecting structural changes in the observed system. As mentioned above, corresponding features are extracted (not shown) from this signature data. The PSD function is defined with more detail in Section 1.7 of Appendix A.

The system also calculates Cepstrum signatures for stationary parts (Such calculations are described in Braun. S. G, Ewins. D. J., Rao. S. S, "Encyclopedia of Vibration", Academic Press. 2002. pp 216–227, 747–748). Statistical Moments (of certain bandwidth) are calculated from the data (619). The moments preferably include DC, RMS, skewness and kurtosis.

The vibration signals are also re-sampled according to each of the relevant rotation speeds for defined failure modes (615) (described in Lyon. R. H., "Machinery Noise and Diagnostics", RH Lyon Corp 1998, Chapter 6). The re-sampling operation (615), as well as dependent operations, are repeated for all rotation speeds. The re-sampling function is defined in more detail in Section 1.5 of Appendix A.

Using the re-sampled vibration signals (615), the system of the present invention preferably calculates signatures three different ways. The Cepstrum signature (631) is calculated from the Orders-PSD (625), described in Lyon. R. H., "Machinery Noise and Diagnostics", Chap. 6 (RH Lyon Corp. 1998), hereby incorporated by reference as fully set forth herein. Features will be extracted from this signature, as described in more detail, below. The Cepstrum function is defined in more detail in Section 1.9 of Appendix A.

The Cepstrum-Orders-Phase signature (639) is derived by first calculating the Phase mean with filter (621), described in Lyon. R. H., "Machinery Noise and Diagnostics" Chap. 7 (RH Lyon Corp 1998), hereby incorporated by reference as if fully set forth herein and then the Orders-Phase average is calculated by employing the PSD data (635). Again, features will be extracted from this signature. The Phase Mean function is defined with more detail in Section 1.6 of Appendix A. In addition, the Statistical Moments-Phase average may be calculated from the Phase Mean (621) as a function of the rotation speed that is synchronized with each observed part (637).

Lastly, another Cepstrum signature is derived by calculating the Envelope with filter from the resampled data (623), described in Lyon. R. H., "Machinery Noise and Diagnostics" Chap. 6.3 (RH Lyon Corp 1998). The Envelope function is defined in more detail in Section 1.8 of Appendix A. In addition, the Orders of the Envelope signature may also be derived, (627) and corresponding features are then extracted. Finally, Statistical Moments, including RMS, Skewness, and Kurtosis, are calculated from the resampled data (629). The statistical Moments function is defined in more detail in Section 1.11 of Appendix A.

Figure 8:
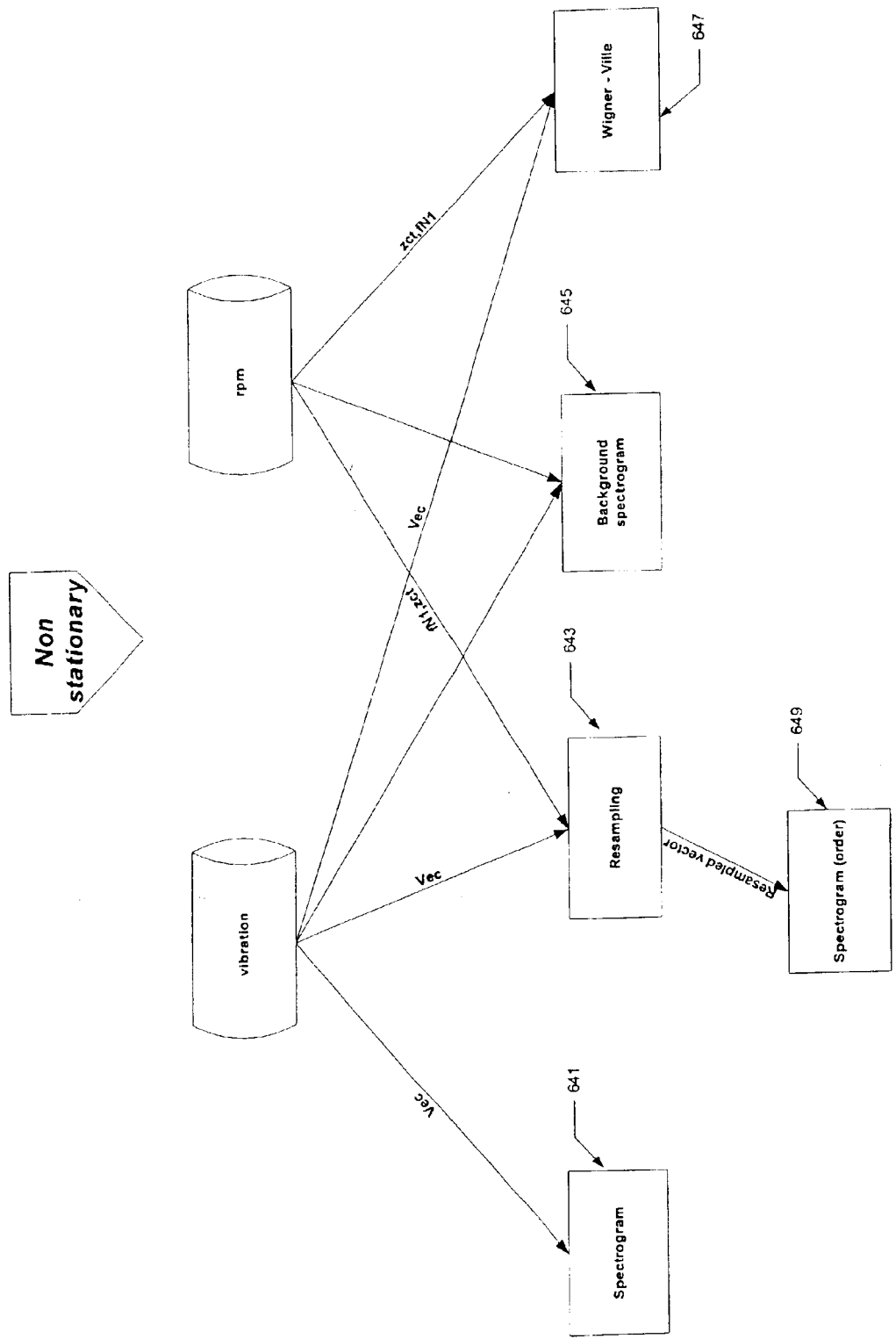
FIG. 8 is a flowchart illustrating vibration signal processing for non-stationary parts.

FIG. 8 illustrates signature generation for non-stationary parts. For Non-stationary parts, where the rotation frequency is not constant, a system of the present invention preferably calculates signatures by employing several domains. The Spectrogram is calculated to provide a time-frequency representation of the data (641) and is described in Braun. S. G, Ewins. D. J., Rao. S. S, "Encyclopedia of Vibration" (Academic Press. 2002), pp. 216–227, 747–748, hereby incorporated by reference as of fully set forth herein. The Spectogram function is also defined in more detail in Section 1.13 of Appendix A.

The Wigner—Ville is calculated to provide a second time-frequency representation of the data (647), described in Braun. S. G, Ewins. D. J., Rao. S. S, "Encyclopedia of Vibration" (Academic Press. 2002), pp. 216–227, 747–748, defined with more detail in Section 1.15 of Appendix A.

The Background Spectrogram of the data, defined with more detail in Section 1.13 of Appendix A, is calculated in 645, followed by extraction of corresponding features. The data is also re-sampled according to each of the relevant rotation speeds for observed parts (643) and using the resampled data the spectrogram by Orders, providing a time-orders representation, is calculated (649). Features from all of these signatures are also extracted.

The system of the present invention next preferably normalizes the signatures to a common denominator to enable comparison between signatures. For this purpose, a model is built, which correlates vibration energy to flight conditions where dynamic pressure is the main factor. This normalization is accomplished by resealing each signature according to this model. This generates about 2 Mega words of signature information. The system then generates the baseline signatures by taking the weighted average of signatures acquired in equivalent operating conditions of a specific system, engine, and gearbox, which are known to be in good condition.

Feature Extraction

In accordance with the present invention and as noted above, features have to be extracted from the various signatures that are calculated. Vibration features are used for the diagnostic and prognostic functions of the present invention. The vibration features are diagnostic index values for a given pointer, in a given domain, for a given vibration signature.

The diagnostic indices are mathematical functions which compare acquired signature data to reference, or baseline, signature data by reference to pointer information associated with the desired features. Pointers are calculated for every type of system, engine and gearbox, using known techniques. Such techniques are described in Braun, S. G, Ewins, D. J., and Rao, S. S, "Encyclopedia of Vibration" (Academic Press. 2002), and in Braun, S., "Mechanical Signature Analysis, theory and applications" (Academic Press 1986), both of which are hereby incorporated by reference as if fully set forth herein. The pointers vary by the mechanical makeup, assembly and physical dimensions of the components being monitored. On average, each aircraft system is associated with about 100–200 pointers. The number of relevant harmonics is defined for each identified pointer. The exact number of harmonics for each pointer depends on the pointer's base frequency and on the physical phenomena it is associated with.

For example, pointers related to rotating motion will appear with many harmonics $$\left( \text{depending on the ratio } \frac{\text{bandwith}}{\text{pointer base frequency}} \right)$$

while pointers related to natural frequencies of a component will manifest without higher harmonics.

Initially, each pointer is preferably calculated in the frequency domain and then converted for reference in other domains, as required. The type of conversion will depend on the domain to which it is converted and the fault characteristics for that pointer. For example, gear-shaft eccentricity manifests as a frequency modulation around the gear-mesh frequency. The frequency modulation is based on the inlet and outlet shaft rotating speeds. In the Cepstrum domain, the pointers representing the frequency modulation are the inverse (1/x) of the respective shaft rotating speeds. Accordingly, the system employs the shaft rotating speed to calculate the relevant pointers.

Once the pointers are calculated, up to nine diagnostic indices are preferably associated with each pointer. Although a variety of diagnostic indices may be used, in one embodiment a system of the invention employs: an arithmetic ("Amn"), geometric ("Gmn"), harmonic ("Hmn"), matched-filter RMS ("Mfrms"), RMS of spectral difference ("Rdo"), Sum-of-Squares ("So"), energy-ration, entropy, and frequency-shift indices. Each index is an operation on the current signature and a reference signature of the observed system. The reference signature is preferably a signature of the observed system for a known condition relating to system health.

The Arithmetic index defines the difference in decibels between the energy of the current signature and the reference signature. The Geometric index is the ratio between the geometric mean of the current signature and the reference signature.

The Harmonic index is the ratio between the harmonic mean of the current signature and the reference signature. The harmonic mean is well known in the art, either as an arithmetic or as a geometric mean.

The Matched Filter Root Mean Square ("Mfrms") is the root mean square of the ratios between the two signatures. The RMS of spectral difference (Rdo) index is the root mean square of the differences between the two signatures in dB. The So index is the sum of squares of differences. Further details of these indices are provided in Appendix A.

The energy-ratio index is the difference between the energy ratio of two adjacent and equal portions of the current spectrum and the similar regions of the baseline spectrum. This ratio emphasizes and detects shifts of frequency pointers and it is mainly used for detection of natural frequency shifts, which manifest as structural changes in the observed system.

The entropy index is the relative entropy of the actual signature as compared with the respective base line signature. The entropy index measures the morphology of the signature around a specific pointer. The relative entropy measures the changes in the pattern morphology.

The frequency shift index calculates the difference between the centers of mass of the actual signature and the respective baseline. The center of mass of the signature is calculated in a predefined region of the signature (around a pointer), representing the frequency (for spectra) where most of the energy is concentrated. The difference between the centers of mass of two signatures quantifies the frequency shift.

Each index identifies a different type of change in the signature pattern in a region around a given pointer. The diagnostic process of the present invention employs the diagnostic indices to detect shifting, energy increases/decreases, sharpness, or spread of the peaks of the signatures, or any combination thereof.

The use of energy-ratio, entropy, and frequency-shift indices for vibration analysis has not been taught prior to the present invention. The other diagnostic indices mentioned above, have been used to compare parametric models (ARMA). See Braun, S. G, Ewins, D. J., and Rao, S. S, "Encyclopedia of Vibration" (Academic Press 2002) and Flandrin, P., "Time-Frequency/Time-scale analysis" (Academic Press 1999), both of which are hereby incorporated by reference as if fully set forth herein.

The calculation of the diagnostic indices leads to a 3-dimensional matrix of vibration features. For the exemplary aircraft engine, there are approximately 500 pointers represented on the x-axis. The y axis represents the diagnostic indices. For the exemplary aircraft engine there are an average of 9 indices for each pointer. The z axis represents the domain in which a signature is shown. For the exemplary aircraft engine, there are about 5 domains. This combination results in approximately 22,500 features in the exemplary aircraft engine.

After providing the features for the observed engine, the system generally proceeds to aggregate the features by employing a weighted averaging formula for the normalized features that are relevant to each particular fault. This includes features extracted from harmonics and sidebands of a primary feature or pointer, as well as features from different domains. Each feature in the aggregation is assigned a weight which affects how the feature influences the overall determination arrived at by the aggregation operation. The main purpose of this formula is to correlate the pattern changes of all the harmonics over the signatures in all domains, which are applicable to a specific failure mode. For example, for a gearbox failure mode, features are aggregated from the first harmonic of the meshing frequency and corresponding sidebands, the second, third, and fourth harmonics of the meshing frequency and corresponding sidebands, and the first three harmonics of the shafts in the cepstrum domain. Furthermore, aggregation helps reduce the amount of data provided to the analysis components of the system.

Prior to aggregating the features, however, the indices for each pointer are collected and normalized. Once normalized, the features representing the harmonics of each pointer are aggregated. Finally, features of the same pointer (of a particular failure mode) are aggregated across the different domains.

Baseline signatures are derived prior to operation of the system so as to allow for comparison of acquired signatures to baseline signatures by employing the various indices. For purposes of this description, a new engine is an engine that operates within the acceptable operational range of a normal engine, and has been recently installed on an airplane, with raw data that varies as a function of environmental and flight conditions. The system of the present invention employs a baseline algorithm to provide a common baseline to all engines of the same type, i.e., eliminate installation and unique engine variation from nominal operation. This algorithm determines the transformation function, which brings each engine to vary around some nominal point. The baseline algorithm generates a compensation mechanism, which, with given flight and environmental input such as mach number, engine pressure ratio, rotation speed, air temperature, air pressure, and the like, is used to generate the nominal average engine parameters that are typical of a "new engine."

The baseline algorithm begins with an acquisition step where data is collected during the first operation period of the engine. A validity and range checking is performed to eliminate all invalid data while retaining valid data snapshots. Thereafter, the new engine data is added to a baseline calculation database.

When using a neural network to calculate the baseline, a different neural network is trained for each parameter transformation to a baseline feature. Thus, a baseline feature is calculated for each flight regime parameter so as to allow the system to later compare features from acquired data to a corresponding baseline associated with the same parameter and flight regime. The network inputs are the relevant environmental and flight data and the target is the appropriate parameter. Exemplary targets are N1 for the rotation speed-low pressure, N2 for the rotation speed-high pressure, EGT for the engine temperature, and FF for fuel flow. In one embodiment, the neural network that is used to create the baseline feature is a multi-layer feed-forward neural network. However, the architecture of the neural network may vary in the transfer function, number of cells in the hidden layers, and number of inputs. A general discussion of such networks is provided in Bishop. C. M., "Neural Networks for pattern Recognition" (Oxford University Press N.Y. 1999) pp 310. and Haykin, S. "Neural Networks" (Prentice Hall 1999), both of which are hereby incorporated by reference as if fully set forth herein.

Similarly, when baseline feature calculation is performed using polynomial fitting, a different polynomial is fitted for each parameter. The fitting criterion is preferably the least mean square ("LMS") error with respect to the measured (actual) parameters from the "baseline calculation database." The order of the polynomial and the input parameters used are the most relevant to the specific parameter. For example, for $\Delta N1$ the input parameter can be EPR and MN and the order of the polynomial can be 3. The polynomial order is preferably high enough to accurately map the normalization function but not so high as to cause an "over fitting" problem. Input parameters are the parameters that reflect environmental influences, which should be eliminated in order to obtain an accurate comparison. In some cases, the environmental influences include the airplane's gross weight, and component temperatures. As in the polynomial order, the system finds the minimum set that provides an accurate normalization.

At this time, the system has available a baseline feature, which is based on the nominal values for the new engine. A shifts transform is applied to shift the engine baseline of the "nominal" value to that of a specific engine. The differential between engines results from differing position and installation on the airplane, and variations in manufacturing. The shift value is derived by calculating average differences between the actual values and the appropriate baselines. This shift is calculated based on the first 20 to 50 flights of an engine on a specific wing position. The baselines are preferably recalculated every time an engine is dismounted and remounted on a wing, because a different installation difference will appear, requiring the calculation of a new shift. Additionally, the baseline is recalculated for any changes of the engine operation line due to maintenance.

Although Gas-Path features are not required, nor are they applicable to every implementation of the present invention, where the invention is applied to aircraft, helicopter or any other complex mechanism, those features are preferably included, particularly for engines since they improve the diagnostic reliability by allowing for correlation between more types of features. As with the vibration data, features are extracted from the gas path data before any diagnostic or prognostic decisions are made. The gas path feature extraction strategy involves several steps for all parameters from a single flight regime. These steps include checking data validity, estimating data quality, data transformations, calculating corrected parameters, calculating a baseline, calculating deviation from that baseline, and calculating all types of features (including trending, gradients, and shifts).

A quality check of the gas path data is performed for each flight, including each flight regime, such as takeoff, landing, and cruising, and for each feature extracted based on the gas path data. The data quality is preferably calculated after the data is acquired, but before the data is transformed into a useful feature.

This quality check involves several steps. First, each parameter is examined to determine whether it is within its acceptable range, as determined by an engine expert or predetermined ranges. Next, the statistical moments of the input data are compared to ranges that have been determined by statistical checking of the historical data. As is known, statistical moments are used to measure the Probability Distribution Function (PDF) by an ordered integration of the PDF function. Since each parameter has different ranges for different flight phases, for example the altitude range at takeoff is different than in cruise, the data is also logically cross-checked with known flight parameters. Finally, the stability of the parameters during the measurements period is also verified to be within a valid range.

Data validation is performed by ensuring that (i) each parameter is within its valid range allowed by the measurement configuration; and (ii) that the flight condition is stable during the measurements period. Prior to deriving the features, the system preferably adjusts the raw data by the Laws of Thermodynamics so that the data follows standard environmental conditions. For example, the system corrects the flight parameters to fit to standard temperature (15 degrees Celsius) and standard altitude (sea level). The applicable transformation formulae for providing such adjustments are known in the art. Generally normalization is discussed in chapter 8 "Pre-processing and feature extraction", Bishop, C. M, "Neural Networks for pattern Recognition" (Oxford University Press, N.Y. 1999), hereby incorporated by reference as if fully set forth herein.

Invalid gas path parameters are not considered in the decision process, or in the trending process. Once the gas path parameters are validated, they are transformed into the more meaningful features. For example, two pressure parameters, pressure 1 and pressure 2 are transformed into a pressure ratio Pressure 1/Pressure 2 which may indicate a pressure ratio variance beyond a normal level.

Next, a baseline feature is derived for each gas path parameter. The baseline feature consists of a generic component based on engine behavior according to each engine type. The baseline is preferably calculated with either a neural network, or through polynomial fitting. By considering accuracy, data type, data amount, and applicability, one skilled in the art may determine which technique is suitable for a given baseline feature.

Another feature employed by a system in accordance with the present invention is the deviation from the baseline. This is preferably a separate value, which is derived for each relevant parameter. The deviation is preferably calculated on all relevant parameters from different flight regimes such as Takeoff, Cruise, and Taxi. Furthermore, in some cases the deviation is calculated for transformed parameters. The term "transformed parameter" refers to a combination of more than one parameter (e.g., ratio of two parameters such as pressure ratio). The flight regimes are characterized by repeatable and stable flight conditions, which facilitates comparison between different engines as well as follow up on the same engine operating under similar conditions. The deviation feature represents a change of a specific parameter in a specific flight regime from the nominal expected value, or baseline.

The deviation is calculated by one of several methods. One method includes calculating the difference between the corrected measured parameter and the calculated baseline. This provides a percent deviation from the baseline. Engine operation lines set by the manufacturer define the normal ranges of operation. For example, the "Surge Line," which can be derived from the compressor operation map provides temperature maps that combine the influences of the engine load environment conditions and engine temperature. The deviation of the engine from its operation line indicates the condition of the engine and its safety margin. Another example is the "Compression Ratio," which defines the ratio between the compressor's intake and exit pressure. The compressor map is a graph of the compression ratios relative to the engine thrust at constant rotation speeds. The compressor surge line is marked on the graph. The distance between the actual working point of the engine to the "Surge Line" provides the safety margin of the compressor.

The "TAKEOFF Engine Temperature Margin" is another operating indicator that can be used to indicate a deviation. The engine temperature is tracked during TAKEOFF, where maximum power and load operation are present. The maximum temperature value is compared with a maximum allowed temperature provided by the manufacturer. The current EGT value preferably depends on flight conditions. The difference between the operation point and the allowed temperature indicates the ability of the engine to operate under the desired load.

An engine can be divided into 4 modules, Low Pressure Compressor (LPC), High Pressure Compressor (HPC), Low Pressure Turbine (LPT), and High Pressure Turbine (HPT). Each module's efficiency is calculated using the intake and exit pressure ratio (corrected for the specific environmental conditions) and engine parameters such as fuel-to-air ratio. As may be appreciated different module divisions are used for calculating efficiencies with different engine models and available parameters. Next, the system extracts diagnostic features from the treated parameters ($\Delta$N1, $\Delta$N2, $\Delta$FF, $\Delta$EGT, EGT_MARGIN). Several different diagnostic features can be extracted from the same set of parameters. For example: snapshot features represent the instantaneous condition, while short and long term trend features represent time dependant deviations in the machine condition.

Trend features represent the deviation tendency of the engine parameters over time (cycles). The deviation tendency is used to diagnose and predict development of engine faults. The constant trend shift method uses constant time (cycles) to evaluate the trend shift for each parameter within the cycle range. The cycle ranges preferably include short-term shifts of about 10 cycles and long-term shifts of about 90 cycles.

In one embodiment, the system also extracts varying term features. These features are values extracted by an automatic algorithm, identifying break points in the trend curve. The Curve breaking point algorithm detects the point (cycle) where the curve starts to change. For this purpose, the system employs several methods: (1) deviation from a predefined linear fitting, (2) polynomial fitting and analysis of the fitted polynomial local minimum or maximum, and (3) estimation of the correlation matrix for the trend beginning and finding the point where this correlation is no longer valid. The Varying Feature algorithm examines the shift of each parameter from a common breaking point, and the number of cycles from the breaking point.

Feature Classification

In a typical aircraft engine, the aggregation of the features leads to approximately 200 features. As will be appreciated by those skilled in the art, for other components, aggregation may result in more or less than 200 features. As is illustrated in FIG. 5, once features are extracted (block 460), the trending process (block 461) is initiated. As used herein, trending refers to the construction of a trend curve. Trend analysis refers to the methodology, which is used to analyze the curve. The trend analysis, shown in block 462, involves calculations of the gradients of the trend curve and the corresponding shifts of the trended parameter. These gradients and shifts become new features. If the trending process or the calculation of the aggregated final features is performed on-board, the data is preferrably transmitted to a ground station where it is analyzed. As described below with reference to the diagnostic process, the diagnostic process is repeated on the trend features to predict data. Decisions are made by reference to predicted data from the prognosis function of the present invention.

Another operation of the diagnostic sequence is verification of over limits. A verified over limit results in an alert. The system of the present invention preferably provides the following data to assist the engine expert in analyzing the over limit event and determine its criticality: a record of all parameters before, during, and after the over limit event; relevant diagnostics history of the engine; and supporting information such as the engine maintenance schedule. The diagnostic process also detects aircraft sensor failures, which are characterized by simultaneous trend shifts of a specific parameter in all of the aircraft's engines.

Snapshot diagnostics uses a Fuzzy ART (Adaptive Resonance Theory) neural network. This is preferably an unsupervised learning classifier, which partitions the parameters' multidimensional space into groups. Any unknown fault that is reflected in the snapshot data will be classified as Novelty until the expert identifies the fault. This classifier continuously improves as more data and feedback are accumulated. The principle of the trend diagnostics is to detect relative changes of the parameters $\Delta$ in respect to previous measurements. The automatic diagnostics sequence is combined from features extracting, multi classification methods and finally decision processes that determine the engine condition and the confidence level of the diagnostics. The novelty detection method is preferably used to affirm the classifier's results.

Before extracting trend features, outlier elimination and smoothing operation are preferably performed. Outlier elimination omits data that is clearly a measurement error. The smoothing procedure uses statistical methods such as moving average, to emphasize the trend behavior. Fitting a linear curve to the specific parameter trend is used for trend feature extraction. The vertical distance between the beginning and the end of the fitted-line is the feature (Shift). The average fitting error is used to determine the confidence level of the classifications that are based on that feature.

There are preferably three main feature types provided by the system. A short term feature is one where a shift is developed during a small number of flight cycles (usually between 10 to 30). This feature is used to detect sudden changes. Examples of failures which manifest in such abrupt changes include broken parts, stuck valves, and open bleeds. A long term feature is one where a shift is calculated over a large number of flight cycles (80 to 120). This feature type is generally used to detect deterioration in engine performance. A varying term feature is one where a shift of trend parameters from an automatically detected break point is observed. This feature type is used to strengthen both previously discussed feature diagnostics. The trend break point is detected by reference to statistical variation in the synchronized trend parameters.

Each one of these features is preferably diagnosed by several classification methods. Each one of the selected classification methods has it own advantage, and the overall method combination is selected to support other decisions. The use of more than one feature and diagnostic method improves the sensitivity and the reliability of the diagnostics decision. The following discussion briefly explains the principles and benefits of each diagnostics method.

Expert system methods facilitate embedding expert knowledge into the diagnostic process of the extracted features. The nearest neighbor method provides a variation of the neural network classification method that is appropriate for use with expert knowledge. The diagnostics sequence is combined from the following steps:

Normalization of the data to a common scale [0–1] for comparison purposes, Expert knowledge, i.e., failure modes definitions, which is mapped into specific states in the features space, The distance (in the feature space) between the input data and the failure states is calculated, The class with the shortest distance from the given input state is selected.

Fuzzy Logic Expert knowledge is embedded in the determination of Fuzzy Sets (FS) and in the Fuzzy Rules (FR). In this method, normal engine operation is considered as one of the "failure modes"; Furthermore, when the diagnostics probability is below a threshold, it is considered a "Novelty."

The Learning diagnostics machine bypasses the need for expert knowledge. The learning machine has a strong classification power that can exceed the knowledge of human experts when a database of identified data is available. The diagnostic approach of the present invention combines supervised and unsupervised learning algorithms. Those algorithms allow adaptation to new identified data and improve the diagnostics performance.

Fuzzy ART (Adaptive Resonance Theory) is an unsupervised diagnosis method. In this method, Supervised learning Neural Networks methodology such as SVM (Support Vector Machine) MLFF (Multi Layer Feed Forward) present extremely powerful classification capabilities. This method eventually becomes the dominant method once enough identified data is accumulated to allow for a higher degree of reliability.

By employing a combination of multi-method multi-feature automatic diagnostics the invention improves the confidence level of the generated alerts, and decreases the number of false alarms. Furthermore, the employed algorithm can be modified to reflect the maturity of the diagnostic method. For example: higher weight is assigned to the expert system during initial development stages, while reduced weight is assigned to the same expert system once enough data is accumulated by the neural-network-based systems.

A main diagnostics procedure combines all the classification results from all the diagnostics methods: over limits, aircraft sensors classifiers, snapshots classifiers, short term trend classifiers, long term trend classifiers and varying term classifiers, to a final diagnostics decision. The decision preferably includes more then one fault, as long-as these faults can potentially coexist. The main diagnostics procedure evaluates the decision confidence level using the classification results and decisions history.

A system in accordance with the present invention provides a prognostic function in addition to the diagnostic function discussed above. In one embodiment, the system provides trend prediction by curve fitting. The curve fitting preferably employs a polynomial method. In another embodiment, the system employs an Auto Regression Moving Average (ARMA) method to predict system behavior. In an alternate embodiment, the system also employs neural network prognostics. Two other prediction methods are fault prediction techniques. One is based on diagnostics of the predicted results, and the other is based on the faults history of a specific engine (engines' sensitivity detection). The Polynomial method fits a polynomial for each existing parameter trend. The polynomial is then used to predict the future value of each parameter which leads to a prediction.

The ARMA prediction model is applied by assuming that the vectors $X_1, X_2, \ldots, X_R$ are samples of a stationary Gaussian process (see Box and Jenkins, 1974), and $$Y_t = \sum_{l=1}^{K}\sum_{i=1}^{p} a_{p(l-1)+i} X_{it-l} + \sum_{i=1}^{q} b_i \varepsilon_{t-i} + \varepsilon_t$$

where $Y_t$ is t-th cycle (a moment of the time series) prediction, $X_i$ is i-th cycle vector, $\varepsilon_t$ is t-th day prediction error, K is a number of "history" moments, p is vector size, q is number of Moving Average (MA) parameters. The challenge is to find the unknown coefficients $a_i$, $b_i$ from a "learning-set" of data.

A multilayer perception (one type of neural network) calculates an output as follows $$Y_t = \phi_{output}\left(\sum_{j=1}^{h} v_j \phi_{hidden}\left(\sum_{l=1}^{K}\sum_{i=1}^{p} w_{p(l-1)+i} X_{it-l} + w_0\right)\right),$$

where $\phi(x)$ is a non-linear activation function, e.g.

$$\phi(x) = \frac{1}{1+e^{-x}},$$

$w_i$ MLP hidden layer coefficients, $v_j$ is MLP output layer coefficients, p is vector size (dimensionally), h is number of hidden neurons, K is number of "history" moments, and the prediction task is to find coefficients $v_j$, $w_i$. Discussion of such networks and analysis can be found in Reference: Box, G. E. P., Jenkins, G. M., *Time series analysis. Forecasting and control*. (Mir, Moscow '974) pp. 1–406, which is incorporated by reference herein.

Figure 9:
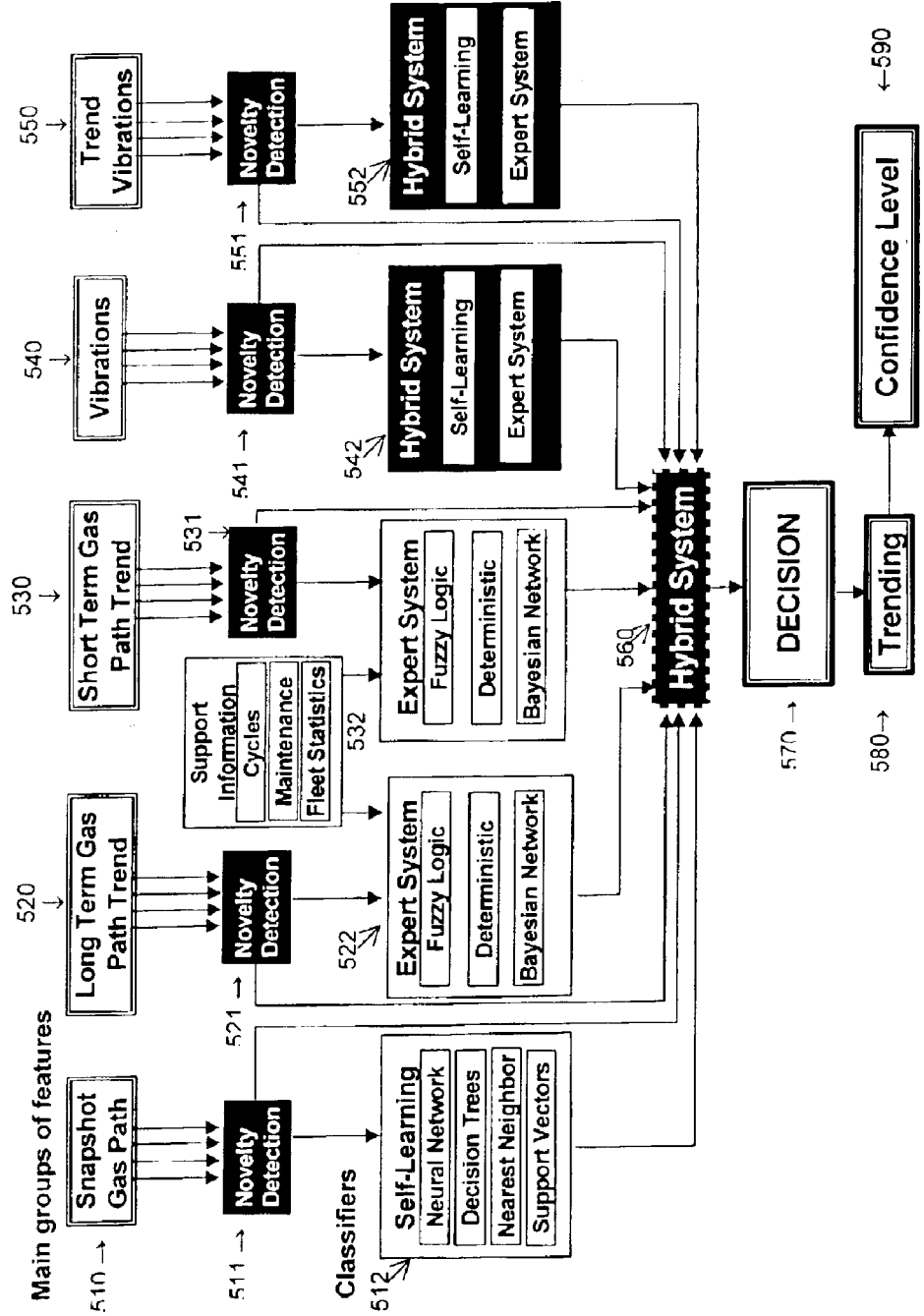
FIG. 9 illustrates analysis performed on features in accordance with the present invention.

Referring to FIG. 9, a block diagram is used to illustrate the decision process as applied to the extracted features. It should be noted that before commencing the decision process, sensors should be checked and data quality and validity considered. Because the decision process involves novelty detection and retraining with new detected features, it is important that the decision process is only performed on data that accurately represents engine conditions. As discussed above, the sensor checking generally includes a validity check, a data quality check, a cross-check between correlated parameters, and a comparison between different engines on the same aircraft. For example, EGT and fuel flow are correlated and should deviate in the same direction. If the two parameters do not deviate in the same direction, a measurement or sensor problem may be the manifested fault rather than an engine problem. In one embodiment, these steps are undertaken during each flight phase over the course of a flight.

The first step of the decision process is novelty detection (511, 521, 531, 541, 551), which is preferably performed separately for each group of features. For this purpose, features that characterize different phenomena are separately grouped. The groups include gas path snapshot features 510, vibration snapshot features (for each failure mode) 540, gas path trend (long and short term) features 520, 530, and vibrations trend features (for each failure mode) 550. Gas path features are grouped according to the failure modes that the features represent, such as snapshot 510 (abrupt failures) or trend data (developed failures), including long term and short term 520, 530.

Vibration features are preferably grouped according to failure modes by employing the aggregated vibration features. Thus, each failure mode is associated with a group of vibration features that indicates its condition. The features in each group are features not used in the diagnosis of, nor indicated on, other failure modes. Consequently, each group is separately diagnosed as a snapshot 540 or as a trend 550. Diagnostic indices are preferably calculated at the pre-defined pointers in all relevant domains, as discussed above. Next, the system processes aggregated vibration features. Each feature is provided by aggregating all relevant harmonics in the corresponding domains. The vibration feature space relevant to each failure type thus contracts as a result of aggregating the vibration features.

The novelty detection algorithms, shown by blocks 511, 521, 531, 541, and 551, detect an unknown combination of group features in accordance with a classification strategy. A preferred classification strategy of system deterioration states for a diagnostic system, which improves and adapts its discrimination capability with a growing quantity of identified examples for each state, is based on three stages. The first stage discriminates between normal operating and deteriorated systems. It is presumed that in the first stage most of the examples are of normal operating systems. The classifier is thus able to detect normal operating systems and conversely initiate alerts when a new pattern is detected. The second stage discriminates between normal operating systems, a limited number of deteriorated stages, and new patterns ("novelties"). This classifier is preferably based on fuzzy ART algorithms, and is adaptable whereby the number of known patterns, or identified deterioration states, is increased as more examples are acquired. The third stage is preferably a robust classifier (based on neural network methodology), which can discriminate between a plurality of deteriorated system states. In order to increase system efficiency and reduce time-lag during diagnostics, the present invention employs a set of modular neural networks, which are combined in a voting system. This approach enables the application of neural networks for diagnostics or classification when the number of examples for each class is limited while the feature space is quite large.

The number of examples needed for training a neural network is proportional to the number of nodes of the network, including the input layer or feature space dimension, and the inner layers nodes and the output layer which correspond to a number of classes. By enlarging the number of networks and dedicating each network to discriminating between only two classes (defect X or not) the resulting network architecture becomes simpler and contains less nodes. The examples needed for training a modular neural network can be reduced by factors of 10–100 (depending on the number of classes and the feature space dimension) while maintaining similar detection rates and probabilities of false alarms.

Several methods may be used for novelty detection. The nearest neighbors method, described in Bishop, C. M, "Neural Networks for pattern Recognition" (Oxford University Press, N.Y. 1999), examines the Euclidean distance in the feature space between the current flight feature and all known features from historically representative flights. The feature space is the space in which the features for a specific classification scheme are provided. An example feature space is long-term shifts of $\Delta N1$, $\Delta N2$, $\Delta EGT$, $\Delta FF$. Fuzzy Adaptive Resonance Theory—Fuzzy ART, groups an 'N' dimensional feature space (flight history) into 'N' dimensional boxes. Each "box" represents a known operational area. If a combination of features from a given flight does not fall within any of the known boxes, it is considered a novel combination.

Hybrid Systems 560, 542, 552, are used to combine the classification results from each group of features. The correlation between different types of features increases the reliability of the final decision. For example, decisions based on the gas path parameters are based on both snapshot features and trend features.

A combination of different classifiers is used by combining novelty detection with the classification to improve the False-Alarm-Detection-Rate ratio. For example, if the novelty detection algorithm indicates that the engine is not properly operating while the classifiers indicate specific faults, the confidence level is increased. On the other hand, if the novelty detection algorithms indicates proper engine operation while the classifiers indicate specific faults, the confidence level is decreased.

As shown in FIG. 9, different artificial intelligence techniques are used to classify the features of each group according to the related knowledge base. For gas path trends, where extensive a priori knowledge is available for a rule base, an expert system based on fuzzy or deterministic logic 522, 532, is employed. Furthermore, where information on probability distribution is available, Bayesian Networks may be used. Expert systems employ classification methods that formulate the expert knowledge into a classification decision, e.g. decision trees and fuzzy logic. Bayesian Networks are statistical diagnostic tools. These two methods are well known in the art and are discussed in Cowell, R. G, Dawid, A. P, Lauritzen, S. L, and Spigelhalter, D. J, "Probabilistic Networks and Expert Systems" (Springer 1999), Chap. 10, in Bishopm, C. M, "Neural Networks for pattern Recognition" (Oxford University Press, N.Y. 1999), Chap. 2, and in Duda, O. R, Hart, E. P, and Strok, G. D, "Pattern Classification" (Wiley-Interscience Publication 2000), incorporated by reference as if fully set forth herein.

As shown by blocks 512, 522, and 532, when enough identified examples are available, self-learning algorithms are used. Examples of self learning algorithms include neural networks, including Multi Layer Feed Forward, Linear, Fuzzy ART, Fuzzy ART Map, and Radial basis neural networks. Other self-learning algorithms include Support Vectors, Decision Trees, Nearest Neighbor, and Fisher discrimination with or without Principal Component Analysis (PCA). Such algorithms are discussed in Bishop, C. M, "Neural Networks for pattern Recognition" (Oxford University Press, N.Y. 1999), pp 310. and Haykin, S. "Neural Networks" (Prentice Hall, 1999), Chap. 8.

For feature groups of vibration and vibration trends, hybrid systems 542, 552, are the preferred classifiers. Hybrid systems 542 and 552, provide an advantage by combining several diagnostic methods. Each group of vibration features may have different properties, which are amenable to different classification methods. Nevertheless, the overall classification is combined from several groups of vibration features. The multi-classifier combination is thus a Hybrid system 560. Since each group relates to a specific failure mode, the principal component of the system is an expert system based on Fuzzy Logic that reflects the reasoning of the vibration analysis expert. The component analyzing the severity of each failure is implemented via self-learning systems (i.e., MLFF NN, and Fuzzy art). These systems correlate between vibration features and failure severity.

Referring back to block 470 of FIG. 5, all decisions of each classifier are trended. The trends are then analyzed and a special classifier subsequently processes their features. The results of the classifiers for related groups of features are combined in block 560 of FIG. 9. A decision is then made in block 570, once on current data, and a second time on predicted data, to arrive at a current diagnosis as well as a future prognosis of the mechanical system. This decision 570 preferably includes a confidence level determined in block 590. The confidence level of the classification 590 is preferably arrived at by combining information related to data quality, feature quality, cross validation between classifiers, cross validation with previous diagnostics results, and each classifier confidence level. In one embodiment, each classifier is associated with a corresponding mechanism for generating the classification confidence level. For example, in fuzzy logic, the confidence level depends on the membership function combined with the specific rule confidence level. The decision arrived at in block 570 is also considered as part of a trend of decisions in block 580. The previous 3–5 system decisions are examined to determine if the arrived at decision of block 570 is indicative of a fault or condition that becomes apparent when observing a series of decision as a continuum.

In addition to the three types of Trend features (Long, Short and Varying terms), the Expert Systems also use peripheral information on the cycles, indicating engine load, maintenance, and comparison to fleet statistics (from similar engines). Some of the peripheral parameters are relevant to the engine condition evaluation. For example, if an engine is new, or just after total overhaul, the probability for fatigue problems is lower than for an engine that has been in use for 20,000 cycles. Another example is the comparison to fleet statistics. If the statistics of the fleet indicates that after 25,000 cycles, a specific problem appears, then the probability of the diagnostics for this problem increases. The prognostics of specific over limits are preferably based on multi-curve fitting, extrapolation, and a prediction based on parametric models. Multi-curve fitting is provided by fitting a multi linear curve to each trend parameter such that the error corresponding to each curve is less than a threshold. Next, extrapolation is performed by using the best fit curve to predict future feature data. Finally, the prediction step uses the data provided by the extrapolation to predict the trend behavior and generate an alert, if so indicated.

The system further employs parametric models such as ARMA and polynomial fitting, to allow on-line detection and initiation of immediate alerts. For example, a stall in the compressor manifests in pressure pulses in one or more stages of the compressor. The pressure pulses rate depends on the rotating velocity of the compressor shaft but the frequencies are not proportional. This phenomenon can be detected using measurement of the compressors case vibrations that can sense the pressure pulses. During stall, the vibration signature exposes the pressure pulses frequency and the higher harmonics. Higher vibration levels over all the frequency range (with the regular pattern) are observed by modulation of the pressure pulses frequency with the blade pass of the compressor stalled stage.

The feedback either from experts or from the field (maintenance data) is used for reinforcing the decision schemes. There are two general cases where feedback is employed. First, feedback upon alerts on "known states" either reassuring or contradicting the specific automatic diagnosis is used to recheck or fine-tune the feature extraction or the decision process algorithms. Second, feedback upon a diagnosed "novelty" is used to enlarge the knowledge base. The specific failure mode is analyzed and the appropriate features and patterns are used for retraining the decision process algorithms. After completion of the retraining, the specific anomaly becomes a "known" defect that can be automatically detected.

The retraining process depends on the specific decision or classification algorithm. For supervised learning techniques (neural networks) the training process is initiated when adding the new patterns to the training set. For expert systems new rules are added to the rule base. In the case of Fuzzy ART algorithms the appropriate class is identified. After the retraining of the system, sets of new parameters for the decision process algorithms are obtained. After the update of the airborne system or the ground station configuration, the system is able to automatically identify the new defect.

Example System Operation

The operation of a system in accordance with the invention will now be illustrated by reference to the operation of the system when diagnosing the condition of a main bearing in an aircraft engine. The description will refer to data provided in Tables A, B, and C, which illustrate failure mode data for select components of an aircraft engine. The values in the "Pointer" column, provided in Tables A and B, are coefficients used to arrive at an observation frequency from a shaft frequency. The reference shaft frequency is provided by a code in the "RPM code" column. The RPM codes refer to codes from Table C, designating various frequencies in the observed engine. For example, code 2 refers to the rotation frequency of the High Pressure shaft. The pointer value from Tables A and B is multiplied by the frequency from Table C to arrive at the observation frequency.

With reference to Table A, the "Harmonics" column designates the number of Harmonics observed for the corresponding fault. The "Channel" column provides a data channel designation, associated with one of several vibration sensors of the system. Accordingly, Table A identifies the sensor data which will be used to generate signatures for each fault. The weight corresponding to the channel designates the decision significance of features arrived at from the channel data. For example, a higher significance assigned to Channel 1 over Channel 2 will entail that features from data provided by Channel 1 will contribute more significantly to the final decision than features from data provided by Channel 2.

The vibration signatures of a system contain information related to the structural properties, dynamic properties (rotation related) and other properties assumed to be aerodynamic related. The structural properties of different components are manifested through the natural (modal) frequencies. The dynamic properties are manifested as energetic peaks at frequencies correlated with their rotation speed. The aerodynamic properties appear at certain operating modes of the system and their manifestation is usually dependent on the specific system.

The first required step for a comprehensive vibration analysis is the identification of each manifested characteristic in the signature. Each class of properties (structural, dynamic and aerodynamic) that is reflected in the vibration signature will require different type of information for its identification. In order to identify the structural properties manifested in the signature, detailed information on the natural frequencies (of all the relevant modes) and their dependency on the rotating speed (or as a substitute the geometry, material, and physical properties) of the engine components is required. Dynamic properties identification requires only geometric and engine general structure information. The identification of aerodynamic properties would require a comprehensive investigation of the operating modes of the subject system.

According to decision process stages illustrated above with respect to FIG. 5, the first, preliminary step, is the failure mode analysis 480, which includes understanding the failure mechanism and its effects on the vibration signature. The automatic algorithms and/or the human expert should be aware of the qualitative as well as quantitative type and range of change in the signature pattern that should be expected.

For structural changes (e.g. blade tip degradation, cracks curling etc) the importance of recognizing and understanding the exact failure mode mechanism and its manifestation in the vibration signature is reinforced because it can be easily confused with other structural changes. Other structural changes may cause the excitation of a "new" natural frequency to appear, or changes that will cause a shift in the natural frequency. All types of structural changes generate a change in the natural frequency pattern. The estimation of the type of pattern change, its dimensions and its location (which of the modes are affected) requires a preliminary investigation for each part and each structural change type.

For a failure related to the dynamic class, the change in the signature is directly related to the rotating motion (e.g. bearings, gears etc), the structural and geometric information on the engine and specific components is sufficient for estimation (prediction) of the expected changes in the signature. These types of failures generate distinctive peaks at precise locations (pointers) in the different analysis domains.

For the purposes of this illustration, an example bearing is said to potentially have four failures: wear of the inner race, wear of the outer race, faulty roller, and wear of the cage surface. This illustration will discuss the relevant observations for detecting a bearing defect of the outer race, such as by wear of the outer race.

When the worn out surface of the outer race is in contact with other surfaces of the bearing, the increased friction between surfaces produces mechanical shocks. The rate of shock production depends on the number of rollers and the diameters of the inner and outer races of the bearing. This information is used to determine how the failure will manifest itself as observed by the system. Because the failure will manifest itself at any rotating speed, the system of the present invention does not require specifying a system state or a minimum load for triggering a diagnosis. Second, the sensor location is selected as a point with high transmission of vibrations to the bearing. In this example, this position is the engine case opposite to the turbine.

The vibrational observation is expected to be a series of shock indications that are proportional to the rotating speed of the bearing and corresponding shaft. A spike is expected to appear in the frequency domain spectrum, at a frequency corresponding to the shock rate. The spikes in the frequency domain should include a first peak at a first frequency and a series of additional peaks at integer multiples of the first frequency, which are the associated harmonic frequencies.

The conclusions of the failure mode analysis are applied for selection of the preferable measurement setup and data analysis procedure. As for other types of failures, signatures of a normal operating system (in good condition) as well as of defective systems (with the specific investigated fault) should be collected. Those signatures (resulting from the signal processing of the measured raw data) provide the database that would be used for tuning the fault identification algorithms (classification).

The next step includes calculating or observing where the spikes in the frequency spectrum would appear. The location of the spikes on the frequency spectrum provides the relevant pointers for the fault. Table A provides relevant pointer data for the bearing. As indicated in Table A, the frequency where the spikes appear depends on the geometry of the bearing and the rotation speed of the corresponding shaft (indicated as $Ib5o_1$). Table C provides the reference rotational value to employ in computing the pointer locations. The harmonics of the first frequency, particularly the odd integer multiples, are also taken into consideration as pointers (indicated as $Ib5o_2 \ldots Ib4o_7$) Since the nonlinearity of the phenomenon provide mainly odd numbered excited harmonies. If the outer race of the specific bearing rotates, the side bands of this pointer are also observed. The sidebands are usually generated due to modulation of the shock amplitude, amplitude modulation, with the rotating speed of the outer race. The side band pointer frequency is calculated by adding and subtracting the sideband rate, or the outer race rotating speed (N2) to and from the main pointer frequency ($Ib5o_1$). Another parameter is the number of sidebands expected to be observed around each pointer. From experience, five to seven sidebands are considered for bearings. The $i^{th}$ sideband frequency is calculated by adding and subtracting the product of i and the sideband rate to and from the main pointer frequency ($Ib5o_1$).

The domains where the pointer data should be observed are selected for the component. Table B illustrates the selected domains and indices for select components of an aircraft engine, including the main bearing. For bearing data, the rate of the shocks is not constant due to variations in shaft rotating speed. To overcome this variability, the data is correlated to the shaft rotating speed during collection to provide a mapping from the time domain into the cycles domain. This provides a constant shock rate and after a second transformation into the orders domain (the spectrum of the signal in the cycles domain), a series of spikes at the corresponding order is obtained, i.e., a number of contacts or shocks per revolution, including corresponding harmonies. When the engine bearing is in good condition, peaks are not expected at this specific order. Because a series of spikes is expected in the orders domain, in the quefrency domain, an increase of the Cepstrum amplitude is expected at the respective quefrency, which is the reverse of the spikes rate in the orders domain. In the orders of the envelope, the envelope signal is always calculated in the cycles domain, where the same phenomenon is expected. The Cepstrum of the envelope orders will reflect the same behavior as the Cepstrum of the orders. In the phase average, which is also calculated in the cycles domain, the shocks will be canceled because their rate is not an integer multiplier of the rotating speed and therefore their phase varies in each cycle.

The feature extraction step, based on the signatures database, includes comparison of the actual signatures to the appropriate baseline signatures of the system in the same operational conditions. The comparison between the patterns of the actual and "normal" signatures is achieved by calculating a set of diagnostic indexes for each pointer. The diagnostic indexes (Vibration Features) characterize the change in the signature pattern around a predefined region (Pointer) that is associated with a specific failure mode. The comparison is performed by reference to Baseline signature obtained from the "normal" signatures available in the database. The Baseline signatures and the determination of their tolerances is one of the key factors for a successful diagnostics.

All vibration features related to a specific failure mode (at all relevant harmonics from all analysis domains of all diagnostic indexes), are aggregated to a figure that represents the probability of occurrence of the specific deterioration severity. The aggregation stage requires a significant amount of signatures, both of normal operating and of defective systems, for determining the appropriate scaling of the diagnostic indexes for each fault type. As for all other engine features, the vibration features are trended and more features are extracted from the trend analysis process.

Next, an analysis of the observed data is designed so as to detect the fault when it arises. Note that all possible data analysis, in all domains, is performed for the observed data since the analysis is not specific for the detection of a single fault type but is often employed for diagnosis of more than one component in the system. As shown in Table B, the domains of interest for the engine bearing outer race failure are: Orders, Cepstrum, Orders of the envelope, and Cepstrum of the envelope. These domains are preferably calculated after synchronization with the rotating speed of the corresponding shaft, as discussed above.

The feature extraction process consists of comparing the actual signature of the system to the baseline signature of the same type, reflecting the same conditions or flight regimes. Both the baseline and actual signatures are calculated using the same analysis procedures. The comparison is performed by calculating a set of diagnostic indexes at each predefined pointer and its sidebands as well as for all harmonies of the pointer and their sidebands. The diagnostic indexes indicated for each pointer in the failure pattern are calculated for all relevant harmonies of the pointer and its relevant sidebands, in each relevant domain, as indicated in the failure mode pattern provided in Table B.

As indicated in Table B, for the ingine bearing outer race defecr detection, the diagnostic indexes of Amn, Gmn, Hmn, Mfrms, So, and Rdo are calculated in the Orders and Envelope orders domainds at the first 3 odd harmonies and at the first 3 sidebands. Finally, all diagnostic indexes belonging to a particular failure node are aggregated using their relative weights, as provided in Table A, in the relevant domains. This aggregate feature provides an indication of component health for the analyzed fault condition. Hence, for the main bearing outer race failure, the aggregate feature would indicate the likelihood that the bearing outer race is failing. In one embodiment, this indication is by observing that the aggregate index result exceeds a threshold level.

The foregoing merely illustrates the principles of the present invention. Those skilled inthe art will be able to devise various modifications, which although not explicitly desribed or shown herein, embody the principles of the invention and are thus within its spirit and scope.

1. Appendix A

1.1. Zero Crossing

[Stat,zct,fN1,fN] = zeroCVec(Vec,SampRate,maxChange,NPointsSmooth,DCMeth,MultFactor)

This function calculates the frequency of a wave as a function of time using the time instants of zero crossings of the wave.

Received parameters:
- Vec - time history vector (raw data vector or another vector) beginning at *Offset* of length *Length* points: vector of integers of length 256-500000 samples.

SampRate – Sampling rate.

maxChange is the maximum frequency change.

NPointsSmooth - number of points for averaging to the smooth function. (Default=10*101).

DCMeth - flag which indicates whether to subtract DC (=1) or not (=0). (Default=1).
- MultFactor - *fN/fN1* multiplication factor. (default=1).

Returned values:

Stat - status / error code

-1 = in case of wrong number of arguments.

-2 = in case of wrong arguments.

zct the time vector of starting points of periods for the Xth *fN/fN1*.

fN1 the smooth of *fN*.
- fN the calculated frequency vector.

Algorithm:
1. Check input data.
2. Calculate time vector of the zero crossing of *Vec*. (*zct*).
3. Calculate the instantaneous rotating frequency, $fN_i = \dfrac{1}{zct_i} (i = 1,2...length(zct))$
4. smooth frequency vector *fN*, *fN1*=smooth(*fN*).

1.2. Smoothing

[y_smoothed, Status] = smooth(Y, window_length).

This function calculates the moving average of Y. The averaging is applied to +/- 0.5 moving window length.

Received parameters:

Y - input data vector window_length - moving average window.

Returned values:

y_smoothed - Y after moving average

Status - debugging status:

0 - the function is working correctly

1 - Warning: all the values in Y are zeros

<0 - error code.

Algorithm:
1. Check input data.
2. Forcing *window_length* to be odd.
3. $N = \min(\lfloor window\_length \rfloor, length(Y))$.
4. Calculating the moving average by convolution of $Y$ with vector of the same length, which contains the $1/N$'s. $conv(f,g) = \int_{-\infty}^{+\infty} f(x-y)*g(y)dy$, In our case it would be:

$$y\_smoothed(k) = \sum_{j=\max(1,k+1-N)}^{\min(k,N)} 1/N * Y(k+1-j)$$

$$k = 1,2,3,...,2*N-1$$

5. Special care for the edge points, for the first $\left\lfloor \frac{N}{2} \right\rfloor$ points:

$$y\_smoothed(k) = \frac{1}{2*k-1} \sum_{i=1}^{2*k-1} Y(i)$$

$$k = 1,2,..., \left\lfloor \frac{N}{2} \right\rfloor$$

and in a similar way for the last $\left\lfloor \frac{N}{2} \right\rfloor$ points.

*1.3.* *Background Spectrogram*

[Stat,Background]=SpectrogramBackground(Vec,zctN1,N1,harmonyN1,delta1,zctN2,N2,harmonyN2,delta2,NewSRate);

Received parameters:
  Vec - time history vector (raw data vector or another vector) beginning at *Offset* of length *Length* points: vector of integers of length 256-500000 samples.
  zctN1 - time vector for the *N1* (same length of *N1*).
  N1 - Rotating frequency vector in rotations per second [Hz].
  harmonyN1 – vector of the number of harmonies of N1 we want to "clean". (floats).
  delta1 – the width of the frequency stripe (*N1*) which we want to filter (+- delta1 for each direction).
  zctN2 - time vector for the *N2* (same length of *N2*).
  N2 - Rotating frequency vector in rotations per second [Hz].
  harmonyN2 - vector of the number of harmonies of *N2* we want to "clean".
  delta2 – the width of the frequency stripe (*N2*) which we want to filter (+- delta1 for each direction).
  • NewSRate – Sampling Rate (could be the new Sampling rate if zooming was called).

Returned values:
  Stat – status / error code (integer).
  • Background – time history vector, after removing (by dynamic filter) the rpm and its harmonies.

Algorithm:
1. Check input data
2. Filtering all the given harmonies of N1 by dynamic BP.
3. Filtering all the given harmonies of N2 by dynamic BP.

$$f_{LP(\Omega)}(t) = \sum_i f(t_i) \frac{\sin[\Omega(t-t_i)]}{\Omega(t-t_i)\frac{\Omega_e}{\Omega}} = \sum_i f(t_i) \frac{\sin[\frac{\Omega_e}{p}(t-t_i)]}{\Omega_e(t-t_i)}$$

$\Omega_e$ = envelope frequency $p = \Omega / \Omega_e$

1.4. Re-sampling

[Stat,Nvec,Tvec,newNvec,newTvec] =
    re-samplingVec(originVec,Offset,Length,SampRate,CpS,XCpS,fac,FiltParStruct)

This function re-samples the signal using a changing rate proportional to the rotating frequency as measured by N1 or N2.

After re-sampling of data:
- The re-sampled vector is represented in a new domain – cycles domain (pseudo-time domain) and after Fourier transform it will be mapped in the Orders domain (pseudo-frequency domain).
- The new sampling rate in the cycles domain is equal to the multiplication factor of the rotating frequency (Fac), such that one period of revolution – one cycle (which becomes constant after re-sampling) contains Fac sampling points that corresponds to 1 cycle.
- The maximum Order (revolution rate multiplier in the pseudo-frequency domain) in the re-sampled signal depends only on the new sample rate or no. of sampled points per revolution, i.e. Fac/2.
- The Order resolution (pseudo-frequency domain resolution) depends on the no. of cycles considered for FFT calculation, i.e. ΔOrder=1/NoCycles.

Received parameters:
    FileName - time history file.
- Offset - start point in the raw data matrix (long integer).
  Length - length of vector Vec (long integer).
  CpS - Rotating frequency vector in rotations per second [Hz] (vector of     length Length/SampRate*20).
- XCpS - time vector for the CpS (same length of CpS).
- Fac - multiplication factor for calculation of the instantaneous sampling rate (float).

- FiltParStruct - structure for filtering options containing:
  - FiltType - Code for filter type: LP, HP, BP, BS (integer).
  - Freq1 - first cutoff frequency (float).
  - Freq2 - second cutoff frequency (float) - only for BP and BS filters
  - Slope - filters slope in [dB/Oct] (integer).
  - PdB - Level at cutoff frequencies [dB] (integer).

o PhaseType - filter phase distortion code: with/out (integer).

Returned values:
   Stat - status / error code
   - Nvec - vector of synchronized time history (float vector of length dependent on the new changing sample rate).
   - Tvec - new time scale, after re-sampling.

Algorithm
   1. Read / build the data vector Vec beginning at Offset of length Length.
   2. Linear interpolation /extrapolation of CpS(XCpS) for time values of t=[0:1/SampRate:Length/SampRate]. The resulting vector is: Freq = interp1(XCpS, CpS, t, 'linear').
   3. Digital integration of Freq vector: Phi, $\varphi_i = \frac{Fac}{SampRate} \sum_{k=1}^{i} Freq_k$.

The vector Phi is now a function of t.
   4. Linear interpolation of t(Phi) for values of $Phi_{new}$=[0:1:fix(max(Phi))]. The new time values founded by interpolation are t1 ( t1 = interp1(Phi, t, $Phi_{new}$, 'linear') ).
   5. Filtration of Vect(t) as required by FiltParStruct – always without phase distortion.
   6. Cubic interpolation of Vec(t) for values of t1: Nvec = interp1(t, Vec, t1, 'cubic').

*1.5.  Phase Mean*

[Stat, PhMvec, xVec] = PhaseMean(Vec, Offset, Length, NoofRevs, SampPRev, NoofFrames, FiltParStruct)

Average of a number of periods of rotation (time history – raw data) previously synchronized to 1/rev signal (Resampling) of N1 or N2. The time history result of phase averaging contains only the harmonic components of the original signal that are proportional (by an integer multiplication factor) to the rotating frequency. All other elements in the original signal are cancelled by this operation (depending on the number of periods averaged).

Received parameters:
- Vec - time history vector [raw data vector after synchronization (e.g.Re-sampling, or another synchronized vector)] beginning at Offset of length Length points: vector of integers of length 256-500000 samples.
- Offset - start point in the raw data matrix (long integer).
- Length - length of vector Vec (long integer).
- NoofRevs - number of revolutions in each set (integer).
- SampPRev - number of samples per revolution (integer).
- NoofFrames - number of frames to average (integer).
- FiltParStruct - structure for filtering options containing:
   FiltType - Code for filter type: 0-no filter, 1-LP, 2-BP, 3-HP, 4-BS (integer).

Freq1 - first cutoff frequency (float).
Freq2 - second cutoff frequency (float) - only for BP and BS filters.
Slope - filters slope in [dB/Oct] (integer).
PdB - Level at cutoff frequencies [dB] (integer).
PhaseType - filter phase distortion code: with/out (0-filtfilt,1-filter).

Returned values:
- Stat - status / error code (integer).
- PhMvec - phase averaged time history vector(float vector of length=NoofRevs*FrameSize).
- xVec - pseudo-time vector (float of length=NoofRevs*FrameSize).

Algorithm:
It is assumed that the given Offset points to the beginning of a revolution of the shaft.
The steps of the algorithm are:
1. Check input parameters integrity:
   a. Length>=SampPRev*NoofRevs*NoofFrames
   b. Offset+Length < length of vector Vec
   c. FiltParStruct.PhaseType=1 (without phase distortion)
2. Calculate the average of the time history in frames of SampPRev*NoofRevs for NoofFrames times: $\bar{y}_{ph}(t_1,...t_M,...t_{KM}) = \dfrac{\sum_{i=1}^{N} y(t_{i_1},...t_{i_M},...t_{i_{KM}})}{N}$ , where:

M=SampPRev, K=NoofRevs, N=NoofFrames, y(t)=Vec.

3. If requested, apply the appropriate filter on the averaged data. For re-sampled data the sampling frequency is 1 (corresponding in the time domain to SampPRev sec per revolution). The filter frequencies have to be entered as orders/NoofFrames.

1.6. PSD

[Stat, Cvec, xVec, NOverLap] = myPSD (Vector, Offset, Length, FrameSize, FFTSize, SampRate, Window, Overlap, Units)
Calculate PSD of the signal and enable overlapping.
Received parameters:
- Vec - time history vector (raw data vector or another vector) beginning at Offset of length. Length points: vector of integers of length 256-500000 samples. Offset - start point in the raw data matrix (long integer)
- Length - length of vector Vec (long integer)
- FrameSize - frame size for calculation (integer)
- NoofFrames - no (number) of frames to average (integer)
- FFTSize - frame size of the FFT output vector*2 - enables zero padding (integer)
- SampRate - Sampling rate of the raw data (float)
- Window - code for window type to apply on vec (integer)
    0 = "Rectangular"
    1 = "Hanning" (default)
    2 = "Hamming"
    3 = "Blackman"
- Overlap - Overlap percentage (float in the range 0-100 (0 default))

- Units - code for physical units (type) of the output spectrum (integer)
    - 0 = (G^2/Hz) (default)
    - 1 = (G)
    - 2 (dB)
    - 3 (velocity m2/sec2/Hz)
    - 4 (velocity [m/sec])
    - 5 (velocity [in/sec])

Returned values:
- Stat - status / error code (integer)
- Cvec - spectrum vector (float vector of length = FFTSize/2)
- xVec - vector of frequencies/orders corresponding to the Cvec (float vector of length = FFTSize/2)
- OverLap - number of frames.

Algorithm:

PSD – Power Spectral Density is defined as $PSD(y) = \dfrac{\sum_{i=1}^{N}|FFT(y_i \cdot w)|^2}{N\Delta f}$ where: $y_i$ – the time history of y in the $i^{th}$ frame, w – window function, $\Delta f$ – spectral resolution, N – number of frames.

1.7. Envelope function [Stat, EnvVcc] = envelop(FileName, Channel, Offset, Length, FrameSize, DCMeth, SampRate ,FiltParStruct)

Calculates the instantaneous / mean envelope of the absolute value of a time history (raw data).
Received parameters:
   FileName - time history file.
   Channel - the channels we are interested in.
   Offset - start point in the raw data matrix (long integer).
- Length - length of vector Vec (long integer).
- FrameSize - frame size for calculation (integer).
- DCMeth - code of method for DC removal/calculation(integer).
        Options:  1-per frame.
                  2-Calculated over all Vec.
                  3-no DC.
   SampRate - Sampling rate of the raw data (float).
   FiltParStruct - structure for filtering options containing:
           FiltType - Code for filter type: 0-no filter, 1-LP, 2-BP, 3-HP, 4-BS
               (integer).
           Freq1 - first cutoff frequency (float).
           Freq2 - second cutoff frequency (float) - only for BP and BS filters.
           Slope - filters slope in [dB/Oct] (integer.(
           PdB - Level at cutoff frequencies [dB] (integer).
           PhaseType - filter phase distortion code: with/out (integer.(
Returned values:
   Stat - status / error code.

EnvVec - envelope history vector (float vector of length equal to Length/FrameSize).

Algorithm:
The envelope of a time history (previously BP filtered or not) is defined as:

$Env(y) = |H\{Filt_{BP}(y)\}|$ where: y – time domain vector, H{•} – Hilbert transform defined by:

$\tilde{y}(t) = H\{y(t)\} = \frac{1}{\pi} \int_{-\infty}^{\infty} \frac{y(\tau)}{t-\tau} d\tau$ and it can be proved that for:

$Y_a(f) = \begin{cases} 2Y(f), & f > 0 \\ Y(f), & f = 0 \\ 0, & f < 0 \end{cases}$, $Y(f) = F\{y(t)\}$ the Hilbert transform of y will be:

$\tilde{y}(t) = \text{Im}\{F^{-1}[Y_a(f)]\}$   $y_a(t) = y(t) + j\tilde{y}(t)$

For calculations of the envelope, the absolute values of the complex vector resulting from the Hilbert transform should be calculated.

When the input parameter FrameSize<Length, after the envelope calculation the frames of the resulting vector should be averaged term by term and the resulting average envelope vector will be of length FrameSize.

When FrameSize=Length, the output vector represents the instantaneous envelope and is of a length of FrameSize.

1.8. Cepstrum

[Stat, Ceps, quefrency] = Cepstrum (PSDvec, FFTSize, SampRate)
Calculates the absolute Cepstrum of a time history (raw data or another vector in the time domain).
Cepstral analysis is a nonlinear signal processing technique that is applied most commonly in speech processing and homomorphic filtering [1].

Received parameters:
  PSDvec - PSD vector.
  FFTSize - frame size for calculation (integer, power of two.
  SampRate - Sampling rate of the raw data (float).

Return values:
- Stat - status / error code (integer).
- Ceps - cepstrum vector (float real/complex vector of length = FFTSize/2)
  quefrency - vector of quefrencies corresponding to the Ceps (float vector of length = FFTSize/2)

The real cepstrum is the inverse Fourier transform of the real logarithm of the magnitude of the Fourier transform of a sequence: $RCy = \Re e\{F^{-1}\{\ln(|F\{y(t)\}|)\}\}$ The real cepstrum is a real-valued function.

[y,ym] = rceps(x) returns both the real cepstrum y and a minimum phase reconstructed version ym of the input sequence.

y = real(ifft(log(abs(fft(x)))));

1.9. Diagnostic Indexes - Faultind

[Stat, Amn, Gmn, Hmn, Mfrms, Rdo, So, Rk, Cm, Re] = faultind(P, PReff, Df1, DfReff, FStart, FEnd, PUnits, flag)

This function calculates 9 diagnostic indexes of a spectrum compared to a reference spectrum. The indexes evaluate the differences between a certain spectrum and a reference spectrum (the appropriate base line in our case).

Received parameters:
- P - Vector of the spectrum to diagnose (floating vector)
- PReff - Vector of the reference spectrum (floating vector - base line)
- Df1 - frequency resolution of P (float)
- DfReff - frequency resolution of Preff (float)
- FStart/F - starting frequency for comparison (float)/main frequency for comparison (in case flag=1)(float)
- FEnd/Npoints - end frequency for comparison (float)/how many points from each side (in case of flag=1)(integer)
- PUnits - Code for Units of both spectra (integer 1-FFT 0-PSD)
- flag - flag=1 means that the user sent F & Npoints. (Default = 0).

Returned values:
- Stat - status code (integer)
- Amn - difference of Amn of spectrum P and the reference spectrum PReff (float) (Amn-Arithmetic mean)
- Gmn - difference of Gmn of spectrum P and the reference spectrum PReff (float) (Gmn-Geometric mean)
- Hmn - difference of Hmn of spectrum P and the reference spectrum PReff (float) (Hmn-Harmonic mean)
- Mfrms - Mfrms index of spectrum P compared to the reference spectrum PReff (float) (Mfrms-Matched Filter Root Mean Square)
- Rdo - Rdo index of spectrum P compared to the reference spectrum PReff (float) (Rdo-rms of spectral difference)
- So - So index of spectrum P compared to the reference spectrum PReff (float) (So-Sum of Squares of Differences)
- Rk - Energy Ratio.
- Cm - center of mass.
- Re - relative entropy.

$$Amn(Y) = 20\log_{10}\left(\frac{\sum_{i=i_1}^{i_N}|Y_i|10^5}{N}\right), \quad \Delta Amn = Amn(Y) - Amn(Y_{reff})$$

$$Gmn(Y) = \frac{\sum_{i=i_1}^{i_N} 20\log_{10}\left(|Y_i|\frac{10^5}{\sqrt{2}}\right)}{N}, \quad \Delta Gmn = Gmn(Y) - Gmn(Y_{reff})$$

$$Hmn(Y) = 20\log_{10}\left(\frac{N*10^{\wedge}5}{\sum_{i=i_1}^{i_N}\frac{1}{|Y_i|}}\right), \quad \Delta Hmn = Hmn(Y) - Hmn(Y_{reff})$$

$$Mfrms = 10\log_{10}\left(\frac{1}{N}\sum_{i=i_1}^{i_N}\frac{|Y_i|^2}{|Y_{reff}|^2}\right)$$

$$Rdo = \sqrt{\frac{1}{N}\sum_{i=i_1}^{i_N}\left(20\log_{10}(|Y_i|) - 20\log_{10}(|Y_{reff}|)\right)^2}$$

$$So = \sqrt{\frac{1}{N}\sum_{i=i_1}^{i_N}\left([20\log_{10}(|Y_i|) + 20\log_{10}(|Y_{reff}|)]*|20\log_{10}(|Y_i|) - 20\log_{10}(|Y_{reff}|)|\right)}$$

$$Rk = 20\log_{10}\left(\frac{\sum_{i=1}^{i=\lfloor\frac{n}{2}\rfloor}P_i}{\sum_{i=\lfloor\frac{n}{2}\rfloor+1}^{i=\lfloor\frac{n}{2}\rfloor*2}P_i} * \frac{\sum_{i=\lfloor\frac{n}{2}\rfloor+1}^{i=\lfloor\frac{n}{2}\rfloor*2}P_{reff_i}}{\sum_{i=1}^{i=\lfloor\frac{n}{2}\rfloor}P_{reff_i}}\right)$$

$$Cm = \frac{\sum_{i=1}^{N}(P_i*f)}{\sum_{i=1}^{N}(P_i)} - \frac{\sum_{i=1}^{N}(P_{reff_i}*f)}{\sum_{i=1}^{N}(P_{reff_i})}$$

$$Re = \sum_{i=1}^{N}\left[P_i*\log\left(\frac{P_i}{P_{reff_i}}\right)\right]$$

1.10. Statistical moments - Moment

[Stat, Mvec, maxRMS] = momentT(Vec, Offset, Length, MomOrder, FrameSize, LenFrameSize, SampRate, DCMeth, FiltParStruct)

This function calculates the different moments of the probability distribution of the data as a function of time or as a function of RPM: DC, RMS, Skweness, and Kurtosis.

Received parameters:
- Vec - time history vector (raw data vector or another vector in the time domain) beginning at Offset of length Length points: vector of floats of length 256-500000 samples.
- Offset - start point in the raw data matrix (long integer)
- Length - length of vector Vec (long integer)
- MomOrder - code for moment type to calculate (integer):
    1 - DC
    2 - RMS
    3 - Skweness
    4 - Kurtosis
- FrameSize - frame size for calculation (integer) or a vector of different frame sizes(when the moment is calculated as a function of RPM)
- LenFrameSize - length of FrameSize.
- SampRate - the sampling rate of the raw data (float).
- DCMeth - code of method for DC removal/calculation(integer).
    Options: 1-per frame.
    2-calculated over all Vec.
    3-no DC.
- FiltParStruct - structure for filtering options containing:
    FiltType - Code for filter type: 0-no filter, 1-LP, 2-BP, 3-HP, 4-BS
    Freq1 - first cutoff frequency (float)
    Freq2 - second cutoff frequency (float) - only for BP and BS filters
    Slope - filters slope in [dB/Oct] (integer)
    PdB - Level at cutoff frequencies [dB] (integer)
    PhaseType - filter phase distortion code: with/out (integer)
        0 - filtfilt
        1 - filter Returned values:
- Stat - status / error code
- Mvec - probability distribution moment history vector (float vector of length equal to Length/FrameSize)
- maxRMS - maximum(RMS). (float).

Algorithm:
The function will calculate the specific moment as a function of time ( FrameSize = Length / max(k) ) or a single value for all the samples of the vector (FrameSize = Length).

The calculation steps are:
1. Check validity / integrity of inputs.
2. If FrameSize<Length (many frames), calculate the no. of frames. For each frame:
2.1. Read the appropriate frame of Vec.
2.2. If requested apply the appropriate digital filter to the frame in Vec. The filter should be applied on a longer vector than the requested FrameSize for moment calculation, i.e. 1024 sample points (if available) preceding the actual frame offset should be concatenated before filtering and ignored after the filtration.
2.3. On the filtered data calculate the requested moment. The DC term in all the following equations refers to a value predetermined depending on the parameter DCMeth. The definitions of the moments are: $DC_k(y_{i_k+1,\ldots,i_k+N}) = \frac{\sum_{j=i_k+1}^{i_k+N} y_j}{N}$ where:

y=Vec, N=FrameSize, k=1,...,N', N'=Length / FrameSize $$RMS_k(y_{i_k+1,\ldots,i_k+N}) = \sqrt{\frac{\sum_{j=i_k+1}^{i_k+N}(y_j - DC_k(y))^2}{N}}$$

$$Skewness(y) = \beta_k(y_{i_k+1,\ldots,i_k+N}) = \frac{\sum_{j=i_k+1}^{i_k+N}(y_j - DC_k(y))^3}{N \cdot RMS_k^3(y)}$$

$$Kurtosis(y) = \gamma_k(y_{i_k+1,\ldots,i_k+N}) = \frac{\sum_{j=i_k+1}^{i_k+N}(y_j - DC_k(y))^4}{N \cdot RMS_k^4(y)}$$

1.11. SegRPM

[Stat, NRPM, Frames, T, Starts] = segRPM( RPMvec, tRPMvec, DRPM, SampRate, minRPM, maxRPM, minimalFrame)

This function calculates a vector of frames and the corresponding segments of time with approximately constant rotating speed, i.e. time segments in which the rotating speed is within predefined boundaries.

Received parameters:
- RPMvec - vector of RPM values in [Hz] or [RPM] or [] (float vector of length 256-50000 samples)
- tRPMvec - vector of time instants corresponding to RPMvec values. If the RPMvec is sampled at constant rate tRPMvec is of length=2 and contains the start time and the sampling rate of tRPMvec. Float vector of length 2 or = length(RPMvec).
- DRPM - the allowed range of the RPM in each frame (±DRPM) in same units as RPMvec.
- SampRate - sampling rate (in order to calculate time frames).
- minRPM - minimal value of RPM range.

- maxRPM - maximal value of RPM range.
- minimalFrame - uses for warning(Stat=1). default=1000.

Returned values:
- Stat - error code
- NRPM - Vector of average RPM in each frame of the Frames vector
- Frames - Vector of frame sizes for the vibration time history. The RPM is within the boundaries defined be DRPM in each frame.
- T - vector of time start instants of each frame in Frames.
- Starts - vector of the frames's starts indexes.

Algorithm:
The function searches for distinct segments of time in which the RPM is within a certain range.
The stages are:

1. Check integrity / validity of the data.
2. Starting from the smallest RPM and up to the maximum value, build a vector of mean RPMs for each step:

i0 = 0;

for ii = 1 : (max(RPMvec) - min(RPMvec)) /2 /DRPM, ind1 = find (RPMvec >= min(RPMvec) + (ii-1) * 2 * DRPM & RPMvec < min(RPMvec) + ii * 2 * DRPM);

if isempty(ind1)~=0, indd=diff([1 ind1]);

i0=i0+1;

inds=[1 find(indd>1)];

inde=[find(indd>1)-1 length(indd)];

NRPM(i0:i0+length(inds)-1) = min(RPMvec) + (ii-1) * 2 * DRPM + DRPM;

Frames(i0:i0+length(inds)-1) = ind1(inde) – ind1(inds) + 1;

T = [T ind1(inds)/SampRate] ;

End

End

1.12. Spectrogram

[Stat, Smat, fVec, tVec] = Spectrogram(Vec, Offset, Length, SampRate, FrameSize, FFTSize, NoofPSDs, Window, Overlap, Units)

Calculates the Spectrogram of a time history (raw data or another vector) enabling zero padding before FFT calculations (improves the frequency resolution) and overlapping of frames for improved time resolution.

Received parameters:
- Vec - time history vector (raw data vector or another vector) beginning at Offset of length Length points: vector of integers of length 256-500000 samples.
- Offset - start point in the raw data vector (long integer)
- Length - length of vector Vec (long integer)
- SampRate - Sampling rate of the raw data (float)
- FrameSize - frame size for calculation (integer)
- FFTSize - frame size of the fft output vector*2 - enables zero padding (integer)
- NoofPSDs - no of spectra to calculate (integer)
- Win - code for window type to apply on vec (integer)
    - 0 = "Rectangular"
    - 1 = "Hanning" (default)
    - 2 = "Hamming"
    - 3 = "Blackman"
- Overlap - overlap percentage (float in the range 0-100 (0 default))
- Units - code for physical units (type) of the output spectrum (integer)
    - 0 = (G^2/Hz) (default)
    - 1 = (G)
    - 2 (dB)
    - 3 (velocity m2/sec2/Hz)
    - 4 (velocity [m/sec])
    - 5 (velocity [in/sec])

Returned values :
- Stat - status / error code (integer)
- Smat - spectra matrix (float matrix of size = [FFTSize/2 x NoofPSDs])
- fVec - vector of frequencies/orders corresponding to the Smat (float vector of length = FFTSize/2)
- tVec - vector of time corresponding to the Smat (float vector of length = NoofPSDs)

1.13. *Cross-spectrum, Transfer and coherence functions*

[Stat, TRNvec, xVec, COHvec] = Tran(Vec1, Vec2, Offset, Length, FrameSize, NoofFrames, SampRate, FFTSize, Winow, overlap)

Calculates the transfer function and the coherence between two time histories (raw data or other 2 vectors).

Received Parameters:

- Vec1 - time history of - input - vector (raw data vector or another vector) beginning at Offset of length Length points: vector of integers of length 256-500000 samples.
- Vec2 - time history of - output - vector (raw data vector or another vector) beginning at Offset of length Length points: vector of integers of length 256-500000 samples
- Offset - start point in the raw data matrix (long integer)
- Length - length of vector Vec (long integer)
- FrameSize - frame size for calculation (integer)
- NoofFrames - no of frames to average (integer)
- SampRate - Sampling rate of the raw data (float)
- FFTSize - frame size of the fft output vector*2 - enables zero padding (integer)
- Window - code for window type to apply on Vec1 and Vec2 (integer)
    - 0 = "Rectangular"
    - 1 = "Hanning" (default)
    - 2 = "Hamming"
    - 3 = "Blackman"
- overlap - overlap percentage (float in the range 0-100 (0 default))

Returned Values:
- Stat - status / error code (integer)
- TRNvec - transfer function vector (complex vector of length = FFTSize/2)
- xVec - vector of frequencies/orders corresponding to the Tvec (float vector of length = FFTSize/2)
- COHvec - coherence vector (float vector of length = FFTSize/2)

Algorithm:

Transfer function defined as: $\dfrac{G_{xy}(f)}{G_{xx}(f)}$

Coherence function defined as: $\dfrac{|G_{xy}(f)|^2}{G_{xx}(f)*G_{yy}(f)}$ $G_{xx}(f)$ - Auto-spectral density function.

$G_{xy}(f)$ - Cross-spectral density function.

1.14. WignerVille

This function calculates Smoothed Wigner-Ville time-frequency distribution.

[Stat,tfr,t,f]=WignerVille(pathName,mode,channel,Tstart,Tend,Fstart,Fdelta,dF);
Received parameters :
- pathName - experiment path. (string)
- mode - mode name. (string)
- channel - channel number. (integer)
- Tstart - start time. (float)
- Tend - end time. (float)

- Fstart - start frequency. (float)
- Fdelta - range of frequency ( Fstart : Fstart+Fdelta ). (float)
- dF - frequency resolution. (float)

Returned values :
- Stat - error/success code.
- tfr - Wigner-Ville matrix.
- t - time vector.
- f - frequency vector.

Algorithm:

$$|X(f)|^2 = \int_{-\infty}^{\infty}\int_{-\infty}^{\infty} x(u)^* x(u) e^{-2\pi i f(u-v)} du dv$$

$x^*$ - complex conjugate of x.

1.15. Filtering function [Stat, Fvec]=filtering(Vec, FiltType, SampRate, MinFreq, MaxFreq, Slope, PdB, PhaseType)

This function enables filtering of time series. Types of filter: LP, HP, BP, BS. The filter is defined by its transfer function.

Vec - time history vector (raw data vector or another vector describing     data in
   the time domain) beginning at Offset of length Length points: vector of integers of length
   256-500000 samples
- FiltType - Code for filter type: 0 - filter no needed,1 - LP, 2 - BP, 3 - HP, 4 - BS.
   SampRate - Sampling rate of the raw data (float)
   MinFreq    - ignored for LP and HP filters and the start freq. for BP and BS filters
   MaxFreq    - the cutoff freq. for LP and HP filters and the end freq. for BP and BS filters
   Slope - filters slope in [dB/Oct] (integer)
   PdB - Level at cutoff frequencies [dB] (integer)
   PhaseType - filter phase distortion code: with/out (integer)
                     0-filtfilt
                     1-filter Returned values:
- Stat - status / error code
- Fvec - filtered vector time history(float vector of length equal to Length)

Algorithm:
   1. Parameters validity check (depending on filter type)

2. Prepare parameters for Butterworth order determination (function 'PrepFilt' calculates the order and coefficients (a,b) of the requested Butterworth filter )
Activate filter/filtfilt filters.

Table A-1

| Pointer Cds | Pointer | Sideband | RPM Code | Harmonies | CHAN | Weight | CHAN | Weight | Description |
|---|---|---|---|---|---|---|---|---|---|
| llps | 1.00000 | | 1 | 10 | 1 | 1 | 2 | 1 | Low Presure Shaft |
| lhps | 1.00000 | | 2 | 10 | 3 | 1 | 4 | 1 | High Presure Shaft |
| lhls | 1.00000 | | 3 | 1 | 2 | 1 | 4 | 1 | High Pressure - Low Presure Shafts |
| lf1b | 36.00000 | | 1 | 3 | 1 | 1 | | | Fan blade pass - Stage1 |
| ll2c | 64.00000 | llps | 1 | 3 | 1 | 1 | | | Low Presure compressor blade pass - Stage 2 |
| ll3c | 70.00000 | llps | 1 | 3 | 1 | 1 | | | Low Presure compressor blade pass - Stage 3 |
| ll4c | 70.00000 | llps | 1 | 3 | 1 | 1 | | | Low Presure compressor blade pass - Stage 4 |
| ll5c | 68.00000 | llps | 1 | 3 | 1 | 1 | | | Low Presure compressor blade pass - Stage 5 |
| lh1c | 38.00000 | lhps | 2 | 3 | 3 | 1 | | | High Presure compressor blade pass - Stage 1 |
| lh2c | 53.00000 | lhps | 2 | 3 | 3 | 1 | | | High Presure compressor blade pass - Stage 2 |
| lh3c | 60.00000 | lhps | 2 | 2 | 3 | 1 | | | High Presure compressor blade pass - Stage 3 |
| lh4c | 68.00000 | lhps | 2 | 3 | 3 | 1 | | | High Presure compressor blade pass - Stage 4 |
| lh5c | 76.00000 | lhps | 2 | 2 | 3 | 1 | | | High Presure compressor blade pass - Stage 5 |
| lh6c | 82.00000 | lhps | 2 | 2 | 3 | 1 | | | High Presure compressor blade pass - Stage 6 |
| lh7c | 82.00000 | lhps | 2 | 3 | 3 | 1 | | | High Presure compressor blade pass - Stage 7 |
| lh8c | 80.00000 | lhps | 2 | 2 | 3 | 1 | | | High Presure compressor blade pass - Stage 8 |
| lh9c | 76.00000 | lhps | 2 | 3 | 3 | 1 | | | High Presure compressor blade pass - Stage 9 |
| lh1t | 80.00000 | lhps | 2 | 1 | 4 | 1 | | | High Presure Turbine blade pass - Stage 1 |
| ll1t | 162.00000 | llps | 1 | 3 | 4 | 1 | | | Low Presure Turbine blade pass - Stage 1 |

| Pointer Codes | Pointer | Sideband | RPM Code | Harmonies | CHAN | Weight | CHAN | Weight | Description |
|---|---|---|---|---|---|---|---|---|---|
| l2t | 150.00000 | | 1 | 1 | 4 | 1 | | | Low Pressure Turbine blade pass - Stage 2 |
| l3t | 150.00000 | lps | 1 | 3 | 4 | 1 | | | Low Pressure Turbine blade pass - Stage 3 |
| l4t | 134.00000 | lps | 1 | 3 | 4 | 1 | | | Low Pressure Turbine blade pass - Stage 4 |
| lb1i | 13.20403 | | 1 | 7 | 2 | 1 | 1 | 0.8 | Bearing # 1 - inner race |
| lb1b | 4.27218 | | 1 | 7 | 2 | 1 | 1 | 0.8 | Bearing # 1 - ball spin |
| lb1o | 10.79597 | | 1 | 7 | 2 | 1 | 1 | 0.8 | Bearing # 1 - outer race |
| lb1c | 0.55017 | lps | 1 | 10 | 2 | 1 | 1 | 0.8 | Bearing # 1 - cage |
| lb2i | 14.27451 | | 1 | 7 | 2 | 1 | 1 | 0.8 | Bearing # 2 - inner race |
| lb2b | 5.05098 | | 1 | 7 | 2 | 1 | 1 | 0.8 | Bearing # 2 - ball spin |
| lb2o | 11.72549 | | 1 | 7 | 2 | 1 | 1 | 0.8 | Bearing # 2 - outer race |
| lb2c | 0.54902 | lps | 1 | 10 | 2 | 1 | 1 | 0.8 | Bearing # 2 - cage |
| lb3i | 11.11305 | | 2 | 7 | 2 | 1 | 3 | 0.8 | Bearing # 3 - inner race |
| lb3b | 3.72076 | lhps | 2 | 7 | 2 | 1 | 3 | 0.8 | Bearing # 3 - ball spin |
| lb3o | 8.88695 | | 2 | 7 | 2 | 1 | 3 | 0.8 | Bearing # 3 - outer race |
| lb3c | 0.55565 | | 2 | 7 | 2 | 1 | 3 | 0.8 | Bearing # 3 - cage |
| lb4i | 16.14650 | | 2 | 7 | 2 | 1 | 3 | 0.8 | Bearing # 3.1 - inner race |
| lb4b | 6.50345 | lhps | 2 | 10 | 2 | 1 | 3 | 0.8 | Bearing # 3.1 - ball spin |
| lb4o | 13.85350 | | 2 | 7 | 2 | 1 | 3 | 0.8 | Bearing # 3.1 - outer race |
| lb4c | 0.53822 | | 2 | 7 | 2 | 1 | 3 | 0.8 | Bearing # 3.1 - cage |
| lb5i | 16.26761 | | 3 | 10 | 2 | 1 | 4 | 0.8 | Bearing # 4 - inner race |
| lb5b | 5.87441 | lps | 1 | 7 | 2 | 1 | 4 | 0.8 | Bearing # 4 - ball spin |
| lb5o | 13.73239 | | 3 | 7 | 2 | 1 | 4 | 0.8 | Bearing # 4 - outer race |
| lb5c | 1.00000 | lhps | 2 | 10 | 2 | 1 | 4 | 0.8 | Bearing # 4 - cage |
| lb6i | 16.14650 | | 1 | 7 | 2 | 1 | 4 | 0.8 | Bearing # 5 - inner race |
| lb6b | 6.50345 | | 1 | 7 | 2 | 1 | 4 | 0.8 | Bearing # 5 - ball spin |
| lb6o | 13.85350 | | 1 | 7 | 2 | 1 | 4 | 0.8 | Bearing # 5 - outer race |

Table A-2

| Pointer Codes | Pointer | Sideband | RPM Code | Harmonics | CHAN | Weight | CHAN | Weight | Description |
|---|---|---|---|---|---|---|---|---|---|
| lb6c | 0.53822 | llps | 1 | 10 |  |  |  |  |  |
| lgsg | 1.00000 |  | 1 | 7 | 2 | 1 | 4 | 0.8 | Bearing # 5 - cage |
| lngm | 31.00000 |  | 5 | 10 | 5 | 1 |  |  | Gear shaft |
|  |  | lgsp | 2 | 10 | 5 | 1 |  |  | Gear mesh |
|  |  | lgsg | 6 | 10 |  |  |  |  |  |
| lgsp | 0.88372 |  | 5 | 10 | 5 | 1 |  |  |  |
| le1pm | 38.00000 |  | 6 | 10 | 5 | 1 |  |  | PTO shaft |
|  |  | lgsg | 6 | 10 |  |  |  |  | PTO gear mesh |
|  |  | lsts | 5 | 10 |  |  |  |  |  |
| lsts | 0.64980 |  | 6 | 10 | 5 | 1 |  |  | starter shaft |
| le1als | 0.47780 |  | 6 | 10 | 5 | 1 |  |  | alternator shaft |
| le1lps | 0.22250 |  | 6 | 10 | 5 | 1 |  |  | lube pump shaft and HMU shaft |
| le1fps | 0.23890 |  | 6 | 10 | 5 | 1 |  |  | fuel boost pump shaft |
| le1bs | 0.64980 |  | 6 | 10 | 5 | 1 |  |  | separator blower shaft |
| le1acs | 0.25790 |  | 6 | 10 | 5 | 1 |  |  | Axis C - idler gear shaft |
| le1acm1 | 16.24500 |  | 6 | 10 | 5 | 1 |  |  | accessory1 spur gear mesh |
|  |  | lsts |  | 10 |  |  |  |  |  |
|  |  | le1acs |  | 10 |  |  |  |  |  |
| le1acm2 | 16.24500 |  | 6 | 10 | 5 | 1 |  |  | accessory2 spur gear mesh |
|  |  | lgesl |  | 10 |  |  |  |  |  |
|  |  | le1acs |  | 10 |  |  |  |  |  |
| le1acm3 | 16.24500 |  | 6 | 10 | 5 | 1 |  |  | accessory3 spur gear mesh |
|  |  | le1als |  | 10 |  |  |  |  |  |
|  |  | le1lps |  | 10 |  |  |  |  |  |
| le1acm4 | 16.24500 |  | 6 | 10 | 5 | 1 |  |  | accessory4 spur gear mesh |
|  |  | le1fps |  | 10 |  |  |  |  |  |
|  |  | le1lps |  | 10 |  |  |  |  |  |
| le1acm5 | 16.24500 |  | 6 | 10 | 5 | 1 |  |  | accessory5 spur gear mesh |
|  |  | le1fps |  | 10 |  |  |  |  |  |
|  |  | le1bs |  | 10 |  |  |  |  |  |
| le1abm | 22.09300 |  | 6 | 10 | 5 | 1 |  |  | Axis A(pto) - axis B bevel gear mesh |
|  |  | le1ps |  | 10 |  |  |  |  |  |
|  |  | lsts |  | 10 |  |  |  |  |  |
| le1b7i | 5.93320 |  | 6 | 10 | 5 | 1 |  |  | PTO bearing inner race |

Table A-3

| Pointer Codes | Pointer | Sideband | RPM Code | Harmonies | CHAN | Weight | CHAN | Weight | Description |
|---|---|---|---|---|---|---|---|---|---|
| le1b7o | 3.78780 | le1ps | 6 | 10 | 5 | 1 | | | PTO bearing outer race* |
| le1b7s | 1.90460 | | 6 | 10 | 5 | 1 | | | PTO bearing spin |
| le1b7c | 0.34430 | | 6 | 10 | 5 | 1 | | | PTO bearing cage |
| lmrig_lch | 21.01590 | lgesl | 2 | 10 | 5 | 1 | 2 | 0.8 | roller bearing_generator housing inner race |
| lmrog_lch | 15.04480 | | 2 | 10 | 5 | 1 | 2 | 0.8 | roller bearing_generator housing outer race* |
| lmrsg_lch | 7.56450 | | 2 | 10 | 5 | 1 | 2 | 0.8 | roller bearing_generator housing spin |
| lmrcg_lch | 1.07460 | | 2 | 10 | 5 | 1 | 2 | 0.8 | roller bearing_generator housing cage |
| lmris_lcr | 8.63590 | lcgsl | 2 | 10 | 5 | 1 | 3 | 0.8 | roller bearing_support gear inner race |
| lmros_lcr | 6.13340 | | 2 | 10 | 5 | 1 | 3 | 0.8 | roller bearing_support gear outer race* |
| lmrss_lcr | 2.64570 | | 2 | 10 | 5 | 1 | 3 | 0.8 | roller bearing_support gear spin |
| lmrcs_lcr | 0.38330 | | 2 | 10 | 5 | 1 | 3 | 0.8 | roller bearing_support gear cage |
| lmbig_l | 13.61830 | lgesl | 2 | 10 | 5 | 1 | 2 | 0.8 | ball bearing_generator inner race |
| lmbog_l | 9.56360 | | 2 | 10 | 5 | 1 | 2 | 0.8 | ball bearing_generator outer race* |
| lmbsg_l | 7.13790 | | 2 | 10 | 5 | 1 | 2 | 0.8 | ball bearing_generator spin |
| lmbcg_l | 1.06260 | | 2 | 10 | 5 | 1 | 2 | 0.8 | ball bearing_generator cage |
| lmbih_l | 14.04380 | lhpsl | 2 | 10 | 5 | 1 | 2 | 0.8 | ball bearing_hydraulic inner race |
| lmboh_l | 9.86240 | | 2 | 10 | 5 | 1 | 2 | 0.8 | ball bearing_hydraulic outer race* |
| lmbsh_l | 7.36090 | | 2 | 10 | 5 | 1 | 2 | 0.8 | ball bearing_hydraulic spin |
| lmbch_l | 1.09580 | | 2 | 10 | 5 | 1 | 2 | 0.8 | ball bearing_hydraulic cage |

Table A-4

| Device Failure Mode | Pointers Code | Sidebands Code | Description | Proccessing Type ('1'-relevant) | | | | | | | | Indexes | | | | | | | |
|---|---|---|---|---|---|---|---|---|---|---|---|---|---|---|---|---|---|---|---|
| | | | | Order | Envelope | Phase Average | Cepstrum | Envelope Cepstrum | PHA Cepstrum | Back-ground | PSD | Am | Gm | Hm | Mfrms | Rdo | So | Rk | Cm |
| bearing 1 | lb1i | | Bearing #1 - inner race | 1 | 1 | | | 1 | | | | 1 | 1 | 1 | 1 | 1 | 1 | | |
| | lb1b | | Bearing #1 - ball spin | 1 | 1 | | | 1 | | | | 1 | 1 | 1 | 1 | 1 | 1 | | |
| | lb1o | llps | Bearing #1 - outer race | 1 | 1 | | | 1 | | | | 1 | 1 | 1 | 1 | 1 | 1 | | |
| | lb1c | | Bearing #1 - cage | 1 | 1 | | | | | | | 1 | 1 | 1 | 1 | 1 | 1 | | |
| | llps | | Low Presure Shaft | 1 | 1 | | | 1 | | | | 1 | 1 | 1 | 1 | 1 | 1 | | |
| bearing 2 | lb2i | | Bearing #2 - inner race | 1 | 1 | | | 1 | | | | 1 | 1 | 1 | 1 | 1 | 1 | | |
| | lb2b | | Bearing #2 - ball spin | 1 | 1 | | | 1 | | | | 1 | 1 | 1 | 1 | 1 | 1 | | |
| | lb2o | llps | Bearing #2 - outer race | 1 | 1 | | | 1 | | | | 1 | 1 | 1 | 1 | 1 | 1 | | |
| | lb2c | | Bearing #2 - cage | 1 | 1 | | | | | | | 1 | 1 | 1 | 1 | 1 | 1 | | |
| | llps | | Low Presure Shaft | 1 | 1 | | | 1 | | | | 1 | 1 | 1 | 1 | 1 | 1 | | |
| bearing 3 | lb3i | | Bearing #3 - inner race | 1 | 1 | | | 1 | | | | 1 | 1 | 1 | 1 | 1 | 1 | | |
| | lb3b | | Bearing #3 - ball spin | 1 | 1 | | | 1 | | | | | 1 | 1 | 1 | 1 | 1 | | |
| | lb3o | lhps | Bearing #3 - outer race | 1 | 1 | | | 1 | | | | | 1 | 1 | 1 | 1 | 1 | | |
| | lb3c | | Bearing #3 - cage | 1 | 1 | | | | | | | | 1 | 1 | 1 | 1 | 1 | | |
| | lhps | | High Presure Shaft | 1 | 1 | | | 1 | | | | | 1 | 1 | 1 | 1 | 1 | | |
| bearing 3.1 | lb4i | lhps | Bearing #3.1 - inner race | 1 | 1 | | | 1 | | | | 1 | 1 | 1 | 1 | 1 | 1 | | |
| | lb4b | | Bearing #3.1 - ball spin | 1 | | | | 1 | | | | 1 | 1 | 1 | 1 | 1 | 1 | | |
| | lb4o | | Bearing #3.1 - outer race | 1 | 1 | | | 1 | | | | 1 | 1 | 1 | 1 | 1 | 1 | | |

Table B-1

| Device Failure Mode | Pointers Code | Sidebands Code | Description | Order | Envelope | Average Phase | Cepstrum | Envelope Cepstrum | PHA Cepstrum | Back-ground | PSD | Am | Gm | Hm | Mtrms | Rdo | So | RK | Cm |
|---|---|---|---|---|---|---|---|---|---|---|---|---|---|---|---|---|---|---|---|
| bearing 4 | lb4c | | Bearing # 3.1 - cage | 1 | 1 | | | | | | | 1 | 1 | 1 | 1 | 1 | 1 | | |
| | lhps | | High Presure Shaft | 1 | 1 | | | | | | | 1 | 1 | 1 | 1 | 1 | 1 | | |
| | lb5i | llps | Bearing # 4 - inner race | 1 | 1 | | | 1 | | | | 1 | 1 | 1 | 1 | 1 | 1 | | |
| | lb5b | | Bearing # 4 - ball spin | 1 | | | | 1 | | | | 1 | 1 | 1 | 1 | 1 | 1 | | |
| | lb5o | lhps | Bearing # 4 - outer race | 1 | 1 | | | 1 | | | | 1 | 1 | 1 | 1 | 1 | 1 | | |
| | lb5c | | Bearing # 4 - cage | 1 | 1 | | | | | | | 1 | 1 | 1 | 1 | 1 | 1 | | |
| | lhls | | High Pressure - Low Presure Shafts | 1 | 1 | | | 1 | | | | 1 | 1 | 1 | 1 | 1 | 1 | | |
| bearing 5 | lb6i | | Bearing # 5 - inner race | 1 | 1 | | | 1 | | | | 1 | 1 | 1 | 1 | 1 | 1 | | |
| | lb6b | | Bearing # 5 - ball spin | 1 | 1 | | | | | | | 1 | 1 | 1 | 1 | 1 | 1 | | |
| | lb6o | | Bearing # 5 - outer race | 1 | 1 | | | 1 | | | | 1 | 1 | 1 | 1 | 1 | 1 | | |
| | lb6c | llps | Bearing # 5 - cage | 1 | 1 | | | | | | | 1 | 1 | 1 | 1 | 1 | 1 | | |
| | llps | | Low Presure Shaft | 1 | 1 | | | | | | | | | | | | 1 | | |
| bearing generator housing | lmbig_l | | ball bearing generator inner race | 1 | 1 | | | 1 | | | | 1 | 1 | | 1 | 1 | 1 | | |
| | lmbog_l | lgesl | ball bearing generator outer race* | 1 | 1 | | | 1 | | | | 1 | 1 | | 1 | 1 | 1 | | |
| | lmbsg_l | | ball bearing generator spin | 1 | 1 | | | 1 | | | | | 1 | | 1 | 1 | 1 | | |

Table B-2

| Device Failure Mode | Pointers Code | Sidebands Code | Description | Order | Envelope | Phase Average | Cepstrum | Envelope Cepstrum | PHA Cepstrum | Back-ground | PSD | Amn | Gmn | Hmn | Mfrms | Rdo | So | Rk | Cm |
|---|---|---|---|---|---|---|---|---|---|---|---|---|---|---|---|---|---|---|---|
| bearing support gear | lmbcg_l | | ball bearing generator cage | 1 | 1 | | | 1 | | | | 1 | 1 | 1 | 1 | 1 | 1 | | |
| | lgesl | | generator shaft | 1 | 1 | | | 1 | | | | 1 | 1 | 1 | 1 | 1 | 1 | | |
| | lmris_lcr | | roller bearing support gear inner race | 1 | 1 | | | 1 | | | | 1 | 1 | 1 | 1 | 1 | 1 | | |
| | lmros_lcr | lcgsl | roller bearing support gear outer race* | 1 | 1 | | | 1 | | | | 1 | 1 | 1 | 1 | 1 | 1 | | |
| | lmrss_lcr | | roller bearing support gear spin | 1 | 1 | | | 1 | | | | 1 | 1 | 1 | 1 | 1 | 1 | | |
| | lmrcs_lcr | | roller bearing support gear cage | 1 | 1 | | | 1 | | | | 1 | 1 | 1 | 1 | 1 | 1 | | |
| | lcgsl | | cluster gear shaft | 1 | 1 | | | 1 | | | | 1 | 1 | 1 | 1 | 1 | 1 | | |
| ball bearing generator | lmbig_l | | ball bearing generator inner race | 1 | 1 | | | 1 | | | | 1 | 1 | 1 | 1 | 1 | 1 | | |
| | lmbog_l | lgesl | ball bearing generator outer race* | 1 | 1 | | | 1 | | | | 1 | 1 | 1 | 1 | 1 | 1 | | |
| | lmbsg_l | | ball bearing generator spin | 1 | 1 | | | 1 | | | | 1 | 1 | 1 | 1 | 1 | 1 | | |
| | lmbcg_l | | ball bearing generator cage | 1 | 1 | | | 1 | | | | 1 | 1 | 1 | 1 | 1 | 1 | | |

Table B-3

Table B-4

| Device Failure Mod | Pointers Code | Sidebands Code | Description | Order | Envelope | Phase Average | Cepstrum | Envelope Cepstrum | PHA Cepstrum | Back-ground | PSD | Amn | Gmn | Hmn | Mfrms | Rdo | So | Rk | Cm |
|---|---|---|---|---|---|---|---|---|---|---|---|---|---|---|---|---|---|---|---|
| accessory1 gear | lgesl | | generator shaft | 1 | 1 | | | | | | | | | | | 1 | 1 | | |
| | le1acm1 | | accessory1 spur gear mesh | 1 | 1 | 1 | 1 | 1 | 1 | | | 1 | 1 | 1 | 1 | 1 | 1 | | |
| | | lsts | | | | | | | | | | | | | | | | | |
| | | le1acs | | | | | | | | | | | | | | | | | |
| | lhpsl | | hydraulic pump shaft | 1 | 1 | 1 | 1 | 1 | 1 | | | 1 | 1 | 1 | 1 | 1 | 1 | | |
| | lgesl | | generator shaft | 1 | 1 | 1 | 1 | 1 | 1 | | | 1 | 1 | 1 | 1 | 1 | 1 | | |
| accessory2 gear | le1acm2 | | accessory2 spur gear mesh | 1 | 1 | 1 | 1 | 1 | 1 | | | 1 | 1 | 1 | 1 | 1 | 1 | | |
| | | lgesl | | | | | | | | | | | | | | | | | |
| | | le1acs | | | | | | | | | | | | | | | | | |
| | lgesl | | generator shaft | 1 | 1 | 1 | 1 | 1 | 1 | | | 1 | 1 | 1 | 1 | 1 | 1 | | |
| | le1acs | | accessory wheel shaft | 1 | 1 | 1 | 1 | 1 | 1 | | | 1 | 1 | 1 | 1 | 1 | 1 | | |
| accessory3 gear | le1acm3 | | accessory3 gear mesh | 1 | 1 | 1 | 1 | 1 | 1 | | | 1 | 1 | 1 | 1 | 1 | 1 | | |
| | | le1als | | | | | | | | | | | | | | | | | |
| | | le1lps | | | | | | | | | | | | | | | | | |
| | le1als | | accessory wheel shaft | 1 | 1 | 1 | 1 | 1 | 1 | | | 1 | 1 | 1 | 1 | 1 | 1 | | |
| | le1ps | | accessory 3 shaft | 1 | 1 | | 1 | 1 | 1 | | | 1 | 1 | 1 | 1 | 1 | 1 | | |
| accessory4 gear | le1acm4 | | accessory4 gear mesh | 1 | 1 | 1 | 1 | 1 | 1 | | | 1 | 1 | 1 | 1 | 1 | 1 | | |
| | | le1fps | | | | | | | | | | | | | | | | | |
| | | le1lps | | | | | | | | | | | | | | | | | |
| | le1fps | | accessory clutch shaft | | | | 1 | 1 | 1 | | | 1 | 1 | 1 | 1 | 1 | 1 | | |

Table B-5

| Device Failure Mode | Pointers Code | Sidebands Code | Description | Order | Envelope | Phase Average | Cepstrum | Envelope Cepstrum | PHA Cepstrum | Back-ground | PSD | Amn | Gmn | Hmn | Mrms | Rdo | So | Rk | Cm |
|---|---|---|---|---|---|---|---|---|---|---|---|---|---|---|---|---|---|---|---|
| accessory5 gear | le1lps | | accessory 3 shaft | 1 | 1 | 1 | 1 | 1 | 1 | | | 1 | 1 | 1 | 1 | 1 | 1 | | |
| | lacm5 | | accessory5 gear mesh | 1 | 1 | 1 | 1 | 1 | 1 | | | 1 | 1 | 1 | 1 | 1 | 1 | | |
| | | lgesr | | 1 | 1 | 1 | 1 | 1 | 1 | | | 1 | 1 | 1 | 1 | 1 | 1 | | |
| | | la1sr | | 1 | 1 | 1 | 1 | 1 | 1 | | | 1 | 1 | 1 | 1 | 1 | 1 | | |
| | lgesr | | generator shaft | 1 | 1 | 1 | 1 | 1 | 1 | | | | 1 | 1 | 1 | 1 | 1 | | |
| | la1sr | | accessory clutch shaft | 1 | 1 | 1 | 1 | 1 | 1 | | | | 1 | 1 | 1 | 1 | 1 | | |
| accessory6 gear | lacm6 | | accessory6 gear mesh | 1 | 1 | 1 | 1 | 1 | 1 | | | 1 | 1 | 1 | 1 | 1 | 1 | | |
| | | lgesr | | 1 | 1 | 1 | 1 | 1 | 1 | | | 1 | 1 | 1 | 1 | 1 | 1 | | |
| | | lhpsr | | 1 | 1 | 1 | 1 | 1 | 1 | | | | | | | | | | |
| | lgesr | | generator shaft | 1 | 1 | 1 | 1 | 1 | 1 | | | 1 | 1 | 1 | 1 | 1 | 1 | | |
| | lhpsr | | hydraulic pump shaft | 1 | 1 | 1 | 1 | 1 | 1 | | | 1 | 1 | 1 | 1 | 1 | 1 | | |
| accessory7 gear | lacm7 | | accessory7 gear mesh | 1 | 1 | 1 | 1 | 1 | 1 | | | 1 | 1 | 1 | 1 | 1 | 1 | | |
| | | lgesr | | 1 | 1 | 1 | 1 | 1 | 1 | | | 1 | 1 | 1 | 1 | 1 | 1 | | |
| | | laps | | 1 | 1 | 1 | 1 | 1 | 1 | | | 1 | 1 | 1 | 1 | 1 | 1 | | |
| | lgesr | | generator shaft | 1 | 1 | 1 | 1 | 1 | 1 | | | 1 | 1 | 1 | 1 | 1 | 1 | | |
| | laps | | APU shaft | 1 | 1 | 1 | 1 | 1 | 1 | | | 1 | 1 | 1 | 1 | 1 | 1 | | |
| Low Presure Shaft | llps | | Low Presure Shaft | 1 | 1 | 1 | 1 | 1 | 1 | | | 1 | 1 | 1 | 1 | 1 | 1 | | |

Table B-6

| Device Failure Mode | Pointers Code | Sidebands Code | Description | Proccessing Type ('1'-relevant) | | | | | | | | Indexes | | | | | | | |
|---|---|---|---|---|---|---|---|---|---|---|---|---|---|---|---|---|---|---|---|
| | | | | Order | Envelope | Phase Average | Cepstrum | Envelope Cepstrum | PHA Cepstrum | Back-ground | PSD | Amn | Gmn | Hmn | Mrms | Rdo | So | Rk | Cm |
| High Presure Shaft | lhps | | High Presure Shaft | 1 | 1 | 1 | 1 | 1 | 1 | | | 1 | 1 | 1 | 1 | 1 | 1 | | |
| Fan blade pass - Stage1 | lf1b | | Fan blade pass - Stage1 | 1 | 1 | 1 | 1 | 1 | 1 | | | 1 | 1 | 1 | 1 | 1 | 1 | | |
| | | llps | | | | | | | | | | | | | | | | | |
| Low Presure compressor blade pass - Stage 2 | ll2c | | Low Pressure compressor blade pass - Stage 2 | 1 | | 1 | 1 | | | | | 1 | 1 | 1 | 1 | 1 | 1 | | |
| | | llps | | | | | | | | | | | | | | | | | |
| Low Presure compressor blade pass - Stage 3 | ll3c | | Low Pressure compressor blade pass - Stage 3 | 1 | | 1 | | | 1 | | | 1 | 1 | 1 | 1 | 1 | 1 | | |
| | | llps | | | | | | | | | | | | | | | | | |

| Devic Failure Mode | Pointers Code | Sidebands Code | Description | Proccessing Type ('1'-relevant) | | | | | | | | Indexes | | | | | | | |
|---|---|---|---|---|---|---|---|---|---|---|---|---|---|---|---|---|---|---|---|
| | | | | Order | Envelope | Phase Average | Cepstrum | Envelope Cepstrum | PHA Cepstrum | Back-ground | PSD | Amn | Gmn | Hmn | Mfrms | Rdo | So | RK | Cm |
| Low Presure compressor blade pass - Stage 4 | II4c | llps | Low Presure compressor blade pass - Stage 4 | 1 | | 1 | 1 | | 1 | | | 1 | 1 | 1 | 1 | 1 | 1 | | |
| Low Presure compressor blade pass - Stage 5 | II5c | llps | Low Presure compressor blade pass - Stage 5 | 1 | | 1 | 1 | | 1 | | | 1 | 1 | 1 | 1 | 1 | 1 | | |
| High Presure compressor blade pass - Stage 1 | Ih1c | llhps | High Presure compressor blade pass - Stage 1 | 1 | | 1 | 1 | | 1 | | | 1 | 1 | 1 | 1 | 1 | 1 | | |

Table B-7

Table B-8

| Device Failure Mode | Pointers Code | Sidebands Code | Description | Proccessing Type ('1'-relevant) | | | | | | | | | Indexes | | | | | | | |
|---|---|---|---|---|---|---|---|---|---|---|---|---|---|---|---|---|---|---|---|---|
| | | | | Order | Envelope | Phase Average | Cepstrum | Envelope Cepstrum | PHA Cepstrum | Back-ground | PSD | Amn | Gmn | Hmn | Mrms | Rdo | So | RK | Cm |
| High Presure compressor blade pass - Stage 2 | lh2c | lhps | High Presure compressor blade pass - Stage 2 | 1 | | 1 | 1 | | 1 | | | 1 | 1 | 1 | 1 | 1 | 1 | | |
| High Presure compressor blade pass - Stage 3 | lh3c | lhps | High Presure compressor blade pass - Stage 3 | 1 | | 1 | 1 | | 1 | | | 1 | 1 | 1 | 1 | 1 | 1 | | |
| High Presure compressor blade pass - Stage 4 | lh4c | lhps | High Presure compressor blade pass - Stage 4 | 1 | | 1 | 1 | | 1 | | | 1 | 1 | 1 | 1 | 1 | 1 | | |

| Device Failure Mode | Pointers Code | Sidebands Code | Description | Proccessing Type ('1'-relevant) | | | | | | | | Indexes | | | | | | | |
|---|---|---|---|---|---|---|---|---|---|---|---|---|---|---|---|---|---|---|---|
| | | | | Order | Envelope | Phase Average | Cepstrum | Envelope Cepstrum | PHA Cepstrum | Back-ground | PSD | Amn | Gmn | Hmn | Mrms | Rdo | So | Rk | Cm |
| High Presure compressor blade pass - Stage 5 | lh5c | lhps | High Presure compressor blade pass - Stage 5 | 1 | | 1 | 1 | | 1 | | | 1 | 1 | 1 | 1 | 1 | 1 | | |
| High Presure compressor blade pass - Stage 6 | lh6c | lhps | High Presure compressor blade pass - Stage 6 | 1 | | 1 | 1 | | | | | 1 | 1 | 1 | 1 | 1 | 1 | | |
| High Presure compressor blade pass - Stage 7 | lh7c | lhps | High Presure compressor blade pass - Stage 7 | 1 | | 1 | 1 | | 1 | | | 1 | 1 | 1 | 1 | 1 | 1 | | |

Table B-9

| Device Failure Mode | Pointers Code | Sidebands Code | Description | Processing Type ('1'-relevant) | | | | | | | | Indexes | | | | | | | |
|---|---|---|---|---|---|---|---|---|---|---|---|---|---|---|---|---|---|---|---|---|
| | | | | Order | Envelope | Phase Average | Cepstrum | Envelope Cepstrum | PHA Cepstrum | Back-ground | PSD | Amn | Gmn | Hmn | Mfms | Rdo | So | RK | Cm |
| High Presure compressor blade pass - Stage 8 | lh8c | lhps | High Presure compressor blade pass - Stage 8 | 1 | | 1 | 1 | | | | | 1 | 1 | 1 | 1 | 1 | 1 | | |
| High Presure compressor blade pass - Stage 9 | lh9c | lhps | High Presure compressor blade pass - Stage 9 | 1 | | 1 | 1 | | | | | 1 | 1 | 1 | 1 | 1 | 1 | | |
| High Presure Turbine blade pass - Stage 1 | lh1t | lhps | High Presure Turbine blade pass - Stage 1 | 1 | | 1 | 1 | | | | | 1 | 1 | 1 | 1 | 1 | 1 | | |

Table B-10

| Device Failure Mode | Pointers Code | Sidebands Code | Description | Processing Type ('1'-relevant) | | | | | | | | Indexes | | | | | | | |
|---|---|---|---|---|---|---|---|---|---|---|---|---|---|---|---|---|---|---|---|
| | | | | Order | Envelope | Phase Average | Cepstrum | Envelope Cepstrum | PHA Cepstrum | Back-ground | PSD | Am | Gm | Hm | Mfms | Rdo | So | Rk | Cm |
| Low Pressure Turbine blade pass - Stage 1 | ll1t | llps | Low Pressure Turbine blade pass - Stage 1 | 1 | | 1 | 1 | | | | | 1 | 1 | 1 | 1 | 1 | 1 | | |
| Low Pressure Turbine blade pass - Stage 2 | ll2t | llps | Low Pressure Turbine blade pass - Stage 2 | 1 | | 1 | 1 | | | | | 1 | 1 | 1 | 1 | 1 | 1 | | |
| Low Pressure Turbine blade pass - Stage 3 | ll3t | llps | Low Pressure Turbine blade pass - Stage 3 | 1 | | 1 | 1 | | | | | 1 | 1 | 1 | 1 | 1 | 1 | | |
| Low Pressure Turbine blade pass - Stage 4 | ll4t | llps | Low Pressure Turbine blade pass - Stage 4 | 1 | | 1 | 1 | | | | | 1 | 1 | 1 | 1 | 1 | 1 | | |

Table B-11

| RPM | Code | Description |
|---|---|---|
| N1 | 1 | Low Presure Shaft |
| N2 | 2 | High Presure Shaft |
| ND | 3 | N2-N1 |
| NC | 4 | 0.54*N1+0.46*N2 |
| NP | 5 | NP engine shaft |
| NG | 6 | NG engine shaft |

Table C

What is claimed is:

1. A health maintenance system for a mechanical system, comprising:
   A vibration sensor, the vibration sensor acquiring vibrational data relating to the mechanical system;
   A data processing circuit, the data processing circuit including a transformation module transforming the data acquired by the vibrational sensor to signature data in a plurality of domains, the signature data associated with at least one predetermined pointer location corresponding to known faults of the mechanical system;
   A diagnosis circuit, the diagnosis circuit extracting features from the signature data by reference to said pointer location associated each signature data, the data diagnosis module employing at least one index function to provide features corresponding to each pointer location and signature data;
   A decision circuit, the decision circuit determining a health status for the mechanical system by reference to the features provided by the diagnosis circuit.

2. The system of claim 1 wherein said mechanical system is an aircraft engine.

3. The system of claim 1 further comprising at least one gas path sensor.

4. A health prognosis method for a mechanical system, the method comprising the steps of:
   monitoring at least one operational parameter of said mechanical system;
   detecting an anomaly in said operational parameters;
   recording at least vibrational data in response to detecting said anomaly;
   processing said vibrational data to provide features associated with said mechanical system;
   trending said features by a prognosis module to provide an expected future feature data; and
   analyzing said future feature data to determine an expected effect on said mechanical system.

5. The method of claim 4 further comprising the step of downloading to at least one communication ground station the data acquired in response to detecting the presence of said anomaly.

6. The method of claim 5 wherein said downloading step via wireless link to said ground stations.

7. The method of claim 5 wherein said downloading step is performed periodically during operation of said mechanical system.

8. The method of claim 5 wherein said downloading step further comprises the step of downloading said anomalies to an off-line data extraction application.

9. The method of claim 4 wherein said recording step includes the recording of an anomaly code indicative of the detected anomaly, and historical data relevant to said anomaly.

10. The method of claim 4 wherein said trending step is triggered by one or more predefined states.

11. The method of claim 4 further comprising the steps of:
    computing at least one life usage indicators; and
    recording said life usage indicators.

12. A method for providing a health indication for a mechanical system, comprising:
    receiving vibrational data from a data collection unit;
    processing the vibrational data to provide at least one wide-band frequency-domain signature and at least one other signature in another domain;
    extracting feature data from said signatures by reference to pointer locations for the signatures and corresponding index functions, the pointer locations and index functions associated with known faults of the mechanical system; and
    comparing the feature data with feature data associated with known system faults to provide a health indication for the mechanical system.

13. A method for diagnosing the health of a mechanical system, the method comprising the steps of:
    receiving vibrational data from at least one sensor monitoring the mechanical system;
    processing the vibrational data to provide features associated with said mechanical system;
    comparing the provided features with features associated with of known fault conditions; and
    determining whether a fault condition should be indicated for said mechanical system based on said comparing.

14. A computer implemented health diagnostic system for a mechanical system, comprising:
    at least one vibration sensor positioned to collect vibration data of at least one component of said mechanical system;
    a data processing circuit, the data processing circuit including a processing unit which transforms the vibration data into signatures in a plurality of domains, each signature data in each domain is associated with at least one pointer, said pointers related to at least one known fault condition of the mechanical system;
    a diagnostic circuit, the diagnostic circuit employs an index function of each pointer location to extract feature data from each signature; and
    a decision circuit, the decision circuit deriving a health status from said feature data extracted by the diagnosis circuit.

15. The system of claim 14, wherein the vibration sensor is further positioned to collect vibrational data from the exterior of enclosure case of said at least one component of the mechanical system.

16. The system of claim 14, wherein said mechanical system is a rotating machine.

17. The system of claim 16, wherein said mechanical system is an aircraft engine.

18. The system of claim 14, wherein said diagnostic circuit further aggregates features of the same pointer location, across a plurality of domains.

19. The system of claim 14, further comprising at least one non-vibration sensor positioned to collect data associated with the mechanical system.

20. The system of claim 14, wherein said at least one non-vibration sensor is a gas path data sensor for collecting mechanical system gas path data.

21. The system of claim 19, further comprising a storage module adapted to record said vibration and said gas path data.

22. The system of claim 14, further comprising an operator display adapted to communicate an indication of mechanical system health.

23. The system of claim 19, wherein the decision circuit is adapted to receive said gas path data for deriving said health status.

24. The system of claim 14, wherein the diagnostic index function comprises a function for comparing a baseline signature extracted during normal system operation with a signature provided by the data processing circuit.

25. The system of claim 14 wherein said diagnostic circuit further assigns relative weight to each feature data item associated with said known fault condition of the system by a corresponding pointer location.

26. A health prognostic method for a mechanical system, the method comprising:

detecting a deviation of operational data, including vibrational data, from a predetermined normal;

recording at least vibration data in response to detecting said anomaly;

transforming the vibration data into signatures in a plurality of domains;

extracting features from said signatures to provide features that are indicative of a health status of a component of said mechanical system;

trending said extracted features to provide expected future feature data; and analyzing said future feature data to provide a prognosis of an expected parameter state for said mechanical system.

27. The method of claim 26 further comprising downloading, to at least one communication ground station, the vibration data acquired in response to detecting the presence of said deviation.

28. The method of claim 27 wherein said downloading step is via wireless link to said ground stations.

29. The method of claim 27 wherein said downloading step is performed periodically during operation of said mechanical system.

30. The method of claim 27 wherein said downloading step is performed subsequent to operation of said mechanical system.

31. The method of claim 27 wherein said downloading step further comprises the step of recording said parameter deviation data by an off-line data extraction application.

32. The method of claim 26 wherein said recording step includes the recording of a parameter deviation code indicative of the detected parameter deviation, along with recording data relevant to said parameter deviation.

33. The method of claim 26 wherein said recording step is triggered by one or more predefined system states.

34. The method of claim 26 wherein said trending step employs polynomial fitting to predict said expected parameter state for the mechanical system.

35. The method of claim 26 wherein said trending step employs adaptive reasoning parametric models to predict said expected parameter state for the mechanical system.

36. The method of claim 26 further comprising the steps of:

computing at least one life usage indicator; and recording said life usage indicator.

37. The method of claim 26, wherein said mechanical system includes at least one inter-shaft bearing, whereby the method detects deterioration of said inter-shaft bearing.

38. A method for providing a health indication for a mechanical system, comprising:

collecting vibration data by a data collection unit;

processing the vibration data to provide at least one wide-band frequency-domain signature and at least one other signature in another domain;

extracting feature data from said signatures by reference to at least one pointer location for the signatures and by employing a corresponding index function, the pointer location and index function associated with known faults of the mechanical system; and comparing the feature data with feature data associated with known system faults to provide a health indication for the mechanical system.

39. A method for diagnosing the health of a mechanical system, comprising:

collecting vibration data by employing at least one vibration sensor;

deriving vibration signatures in multiple domains by transforming the vibration data to multiple domains;

extracting data from each signature by reference to predetermined pointer data;

employing an index function to extract feature data from the vibration signatures in the various domains by comparing said extracted data to baseline data associated with the index function;

aggregating feature data associated with a known fault;

comparing said feature data to a predetermined threshold to diagnose the health of the mechanical system.

40. The method of claim 39, wherein said pointer data defines at least one domain region applicable to a known system fault.

41. The method of claim 40, wherein the pointer data defined region is compared to a baseline region by using diagnostic indices.

42. The method of claim 39, wherein each index provides feature data by reference to deviation of the pointer defined region from the same region of baseline data.

43. The method of claim 39, further comprising aggregating the feature data to arrive at a health diagnosis for the mechanical system.

44. The method of claim 43, wherein said aggregating further includes combining the extracted features with features from gas path data.

45. The method of claim 39, further comprising predicting failures of the mechanical system by comparing the extracted features to historical data relating to known faults.

46. The method of claim 39, wherein said domains are selected from the group consisting of time, order, quefrency, time-frequency response, amplitude, parameters, rotations per second, RPS-order, cycles, envelope, phase average, orders of envelope, cepstrum of envelope, and background spectra in the frequency domain.

47. The method of claim 39, wherein said signature analysis is wideband from 0 to 5 KHz.

* * * * *